United States Patent
Zhang et al.

(10) Patent No.: US 11,832,330 B2
(45) Date of Patent: Nov. 28, 2023

(54) BEAM FAILURE DETECTION FOR FULL-DUPLEX COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/356,396

(22) Filed: Jun. 23, 2021

(65) Prior Publication Data

US 2021/0410221 A1    Dec. 30, 2021

Related U.S. Application Data

(60) Provisional application No. 63/044,977, filed on Jun. 26, 2020.

(51) Int. Cl.
*H04W 76/19* (2018.01)
*H04W 24/08* (2009.01)
*H04L 5/00* (2006.01)
*H04L 5/14* (2006.01)

(52) U.S. Cl.
CPC .......... *H04W 76/19* (2018.02); *H04L 5/0048* (2013.01); *H04L 5/14* (2013.01); *H04W 24/08* (2013.01)

(58) Field of Classification Search
CPC ....... H04L 5/14; H04L 5/0048; H04L 5/0023; H04B 7/0695; H04W 76/19; H04W 16/28; H04W 24/08
See application file for complete search history.

(56) References Cited

U.S. PATENT DOCUMENTS

| | | | |
|---|---|---|---|
| 2017/0207845 A1* | 7/2017 | Moon | H04B 7/088 |
| 2018/0234960 A1* | 8/2018 | Nagaraja | H04W 72/046 |
| 2019/0173644 A1* | 6/2019 | Lyu | H04W 24/08 |
| 2019/0230547 A1* | 7/2019 | Li | H04W 72/121 |
| 2019/0253127 A1* | 8/2019 | Kang | H04W 72/046 |
| 2019/0260485 A1* | 8/2019 | Byun | H04B 17/336 |
| 2019/0327769 A1* | 10/2019 | Yang | H04W 72/046 |
| 2020/0137821 A1* | 4/2020 | Cirik | H04B 7/063 |
| 2020/0213034 A1* | 7/2020 | Zhou | H04B 7/0617 |
| 2021/0266926 A1* | 8/2021 | Gao | H04L 5/0094 |
| 2022/0182160 A1* | 6/2022 | Su | H04L 27/2691 |
| 2022/0224393 A1* | 7/2022 | Gao | H04W 72/1263 |

* cited by examiner

*Primary Examiner* — Ian N Moore
*Assistant Examiner* — Sun Jong Kim
(74) *Attorney, Agent, or Firm* — QUALCOMM Incorporated

(57) ABSTRACT

A beam failure in a full-duplex communication scenario may be detected based on a reference signal measurement. For example, a user equipment (UE) may measure a downlink reference signal transmitted by a base station and/or an uplink reference signal transmitted by the UE and derive a quality parameter based on one or both of these measurements. If the quality parameter indicates a beam failure, the UE may generate an indication that one or more of the beams monitored by the UE have failed.

30 Claims, 18 Drawing Sheets

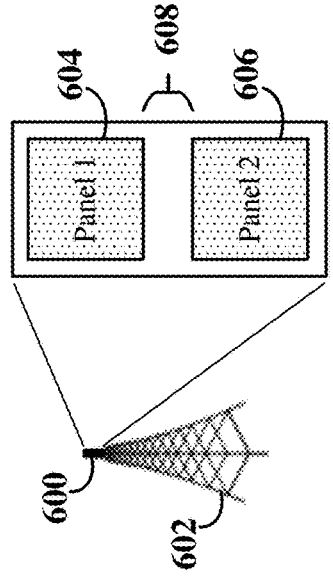
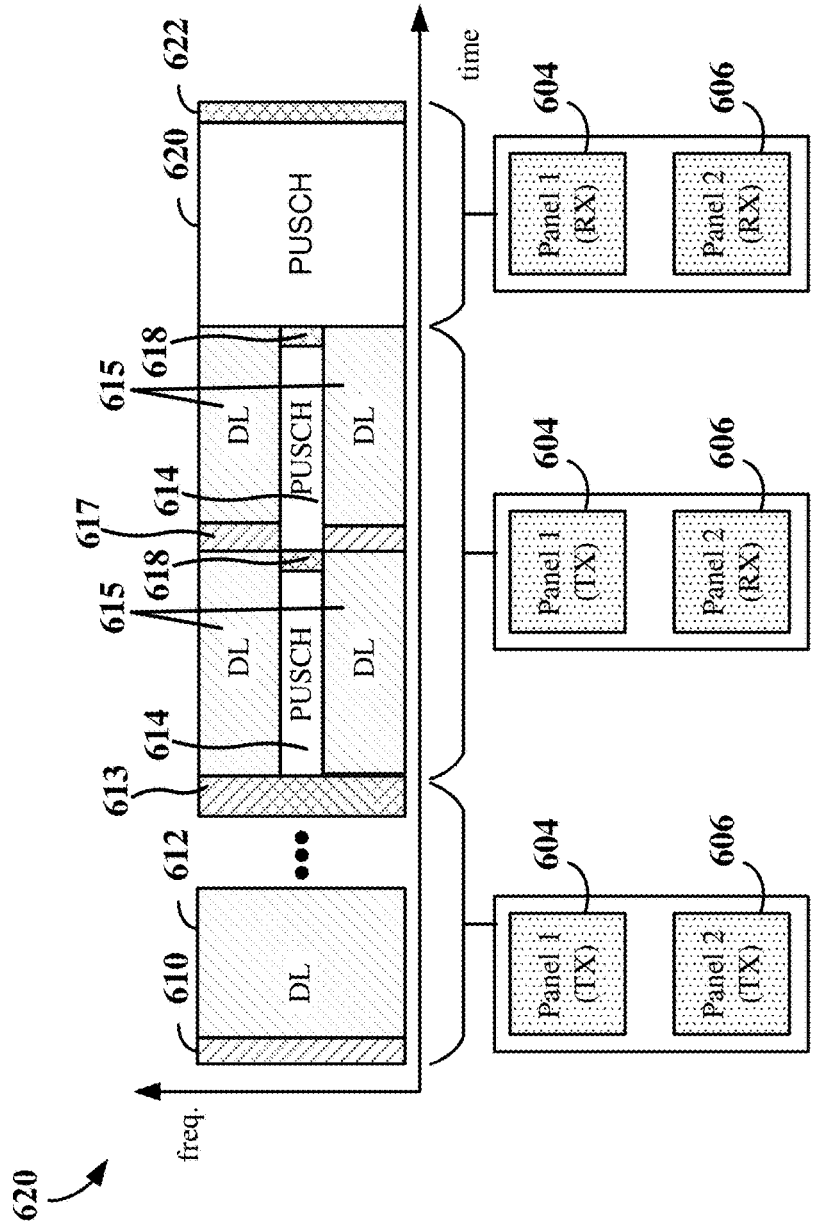
FIG. 6A
FIG. 6B

BEAM FAILURE DETECTION FOR FULL-DUPLEX COMMUNICATION

CROSS-REFERENCE TO RELATED APPLICATIONS

The present application for patent claims priority to and the benefit of U.S. Provisional Application No. 63/044,977, titled "BEAM FAILURE DETECTION" filed Jun. 26, 2020, and assigned to the assignee hereof and hereby expressly incorporated by reference herein as if fully set forth below in its entirety and for all applicable purposes.

TECHNICAL FIELD

The technology discussed below relates generally to wireless communication networks and, more particularly, to beam failure detection and actions taken as a result of a detected beam failure in beam-based communication scenarios (e.g., millimeter wave communication scenarios).

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select at least one beam pair link (BPL) for communication between the base station and the UE on a downlink and/or an uplink. Each BPL includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full-duplex (FD) communication may be used in 5G systems. In some examples, FD allows simultaneous two-way communication by using spatial multiplexing. In the case of FD using spatial multiplexing, different antenna arrays (e.g., different antenna panels) and beams are operable at the same time but still can achieve FD simultaneous communication through spatial separation (e.g., such as through beam direction). The downlink and uplink frequency bands in FD communication may be fully overlapped, partially overlapped or separated with a guard band in between.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for full-duplex (FD) communication at a user equipment is disclosed. The method may include receiving at least one downlink reference signal from a base station, transmitting at least one uplink reference signal to the base station, and transmitting a beam failure recovery request to the base station based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, a user equipment for full-duplex (FD) communication may include a transceiver, a memory, and a processor coupled to the transceiver and the memory. The processor and the memory may be configured to receive at least one downlink reference signal from a base station via the transceiver, transmit at least one uplink reference signal to the base station via the transceiver, and transmit a beam failure recovery request to the base station via the transceiver based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, a user equipment for full-duplex (FD) communication may include means for receiving at least one downlink reference signal from a base station, means for transmitting at least one uplink reference signal to the base station, and means for transmitting a beam failure recovery request to the base station based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, an article of manufacture for use by a user equipment for full-duplex (FD) communication includes a non-transitory computer-readable medium having stored therein instructions executable by one or more processors of the user equipment to receive at least one downlink reference signal from a base station, transmit at least one uplink reference signal to the base station, and transmit a beam failure recovery request to the base station based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, a method for full-duplex (FD) communication at a base station is disclosed. The method may include transmitting at least one downlink reference signal, receiving at least one uplink reference signal from a user equipment, and transmitting a beam failure recovery message to the user equipment based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, a base station for full-duplex (FD) communication may include a transceiver, a memory, and a processor coupled to the transceiver and the memory. The processor and the memory may be configured to transmit at least one downlink reference signal via the transceiver, receive at least one uplink reference signal from a user equipment via the transceiver, and transmit a beam failure recovery message to the user equipment via the transceiver based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, a base station for full-duplex (FD) communication may include means for transmitting at least one downlink reference signal, means for receiving at least one uplink reference signal from a user equipment, and means for transmitting a beam failure recovery message to the user equipment based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

In some examples, an article of manufacture for use by a base station for full-duplex (FD) communication includes a non-transitory computer-readable medium having stored therein instructions executable by one or more processors of the base station to transmit at least one downlink reference signal, receive at least one uplink reference signal from a user equipment, and transmit a beam failure recovery message to the user equipment based on a comparison between at least one quality parameter and a threshold. The at least one quality parameter may be based on respective measurements of the at least one downlink reference signal, the at least one uplink reference signal, or a combination of the at least one downlink reference signal and the at least one uplink reference signal.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIGS. 6A and 6B are diagrams depicting communication via two antenna panels according to some aspects.

DETAILED DESCRIPTION

Figure 1:
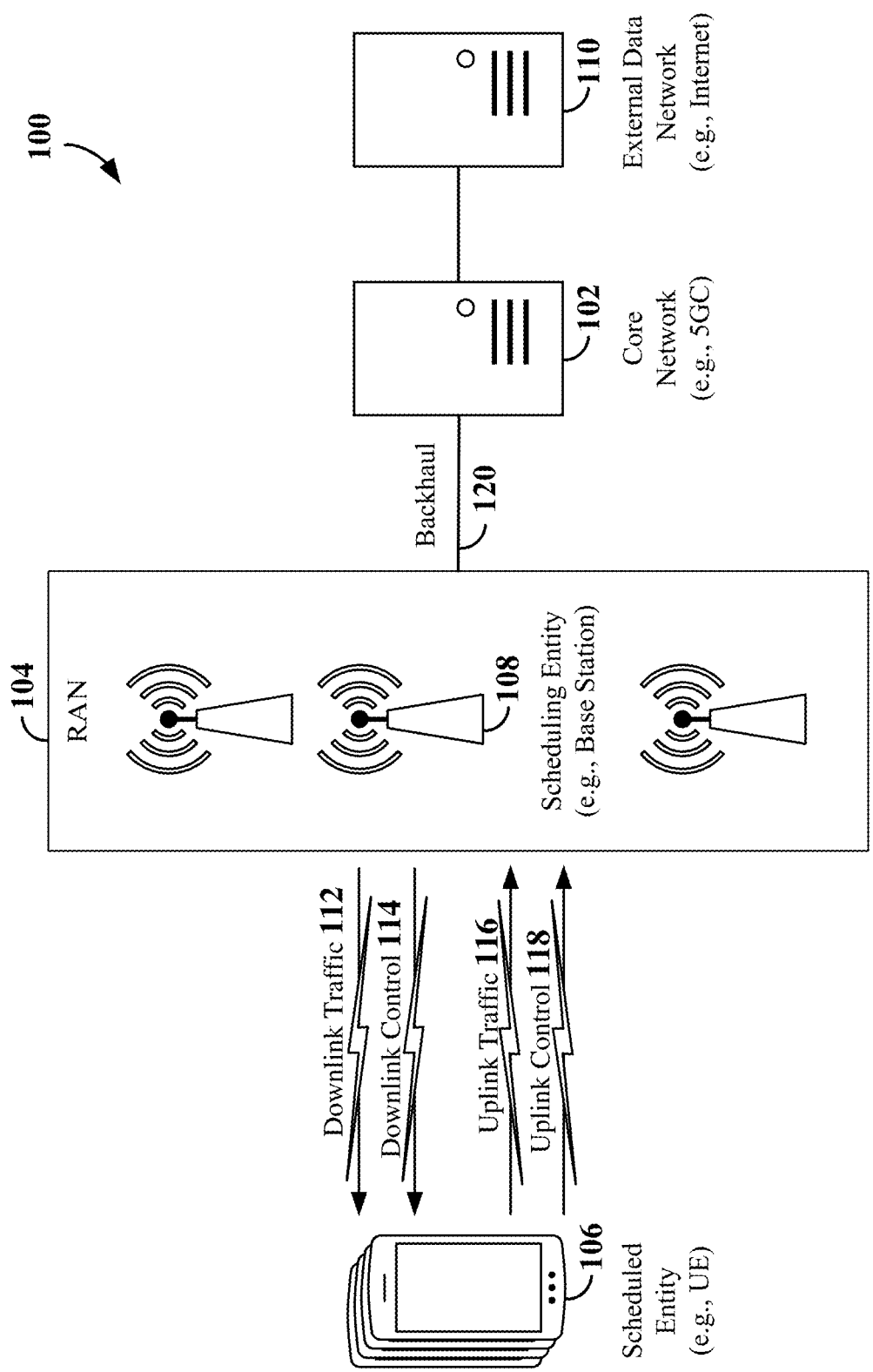
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligenceenabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The disclosure relates in some aspects to detecting a beam failure and actions taken as a result of a detected beam failure. Causes of beam failure may include, for example, a degradation in the quality of a downlink (DL), a degradation in the quality of an uplink (UL), an increase in self-interference on a downlink during full-duplex (FD) operation, or an increase in self-interference on an uplink during FD operation.

In some examples, a beam failure due to self-interference in a full-duplex communication scenario may be detected based on a signal-to-interference-plus-noise ratio (SINR). For example, a UE may measure, on a receive beam of the UE, downlink reference signals transmitted by a base station on a downlink beam in addition to uplink reference signals transmitted by the UE on an uplink beam. The UE may then combine these measurements (e.g., channel measurements based on the downlink reference signals and self-interference measurements based on the uplink reference signals) to determine whether the quality of the downlink indicates a beam failure (e.g., by comparing a measured SINR or a block error rate (BER) based on the SINR to a threshold).

In some examples, a base station may send configuration information to the UE that specifies the resources that the UE is to monitor for beam failure detection operations. For example, the configuration information may specify channel measurement resources that will carry downlink reference signals transmitted by the base station. As another example, the configuration information may specify at least one interference measurement resources (IMR) on which the UE is to transmit uplink reference signals. For a self-interference measurement, the UE may use one antenna panel to transmit uplink reference signals and another antenna panel to receive and measure self-interference.

Upon detection of a beam failure, the UE may generate an indication of the beam failure. In some examples, the beam failure indication indicates that all of the active beams monitored by the UE have failed. An active beam may be defined as a beam that was selected by the base station for data and control channel transmissions (e.g., selected from among a set of candidate beams that were selected and reported by the UE). In some examples, the active beams may be selected control resource set (CORESET) beams (e.g., two CORESET beams or some other number of CORESET beams). In some examples, the beam failure indication indicates that one or more of the beams monitored by the UE have failed. In this latter case, the beam failure indication may include an identifier of each failed beam.

The disclosure relates in some aspects to a UE transmitting a beam failure recovery request to a base station. The manner in which the UE transmits the beam failure recovery request may depend on whether an uplink from the UE to the base station is currently working. If the uplink is working, the UE may transmit the beam failure recovery request via uplink signaling (e.g., via a physical uplink control channel or a physical uplink shared channel). If the uplink is not working or if the beam failure is due to downlink channel degradation, the UE may transmit the beam failure recovery request via a random access channel (RACH) message. The beam failure recovery request may indicate that all of the beams monitored by the UE have failed or that one or more of the beams monitored by the UE have failed. Also, the beam failure recovery request may indicate whether the beam failure is due to downlink quality degradation or self-interference.

In some examples, a UE may determine whether a beam failure is due to downlink degradation or due to self-interference by initially measuring only downlink reference signals to determine whether a deterioration in the downlink quality was sufficient on its own to cause the beam failure. If so, the UE and/or the base station may take steps to address the deterioration in the downlink quality (e.g., select a different downlink beam). On the other hand, if the beam failure was caused by self-interference, the UE and/or the base station may take steps to address the self-interference (e.g., switch to half-duplex operation or some other mode of operation).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
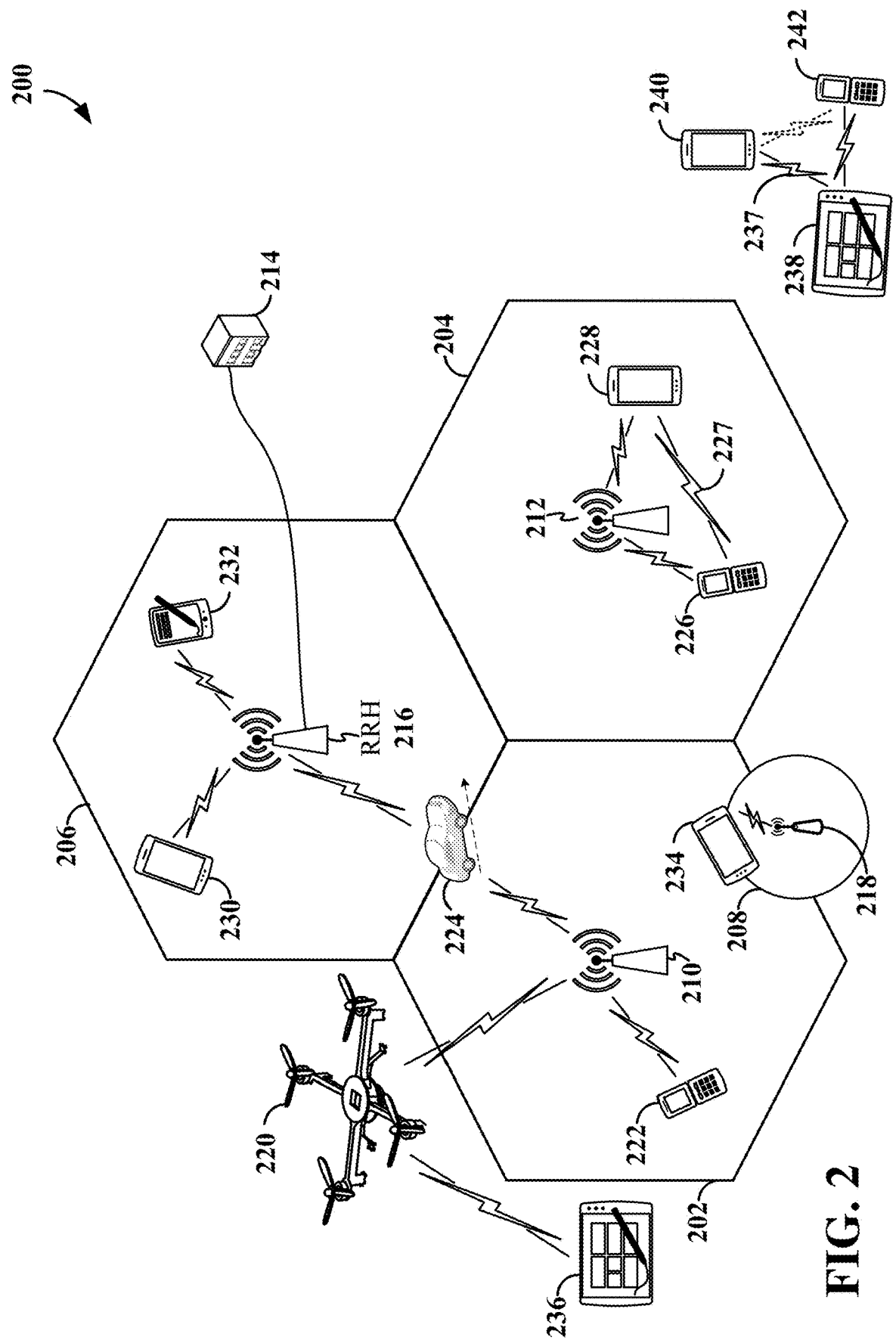
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex (FD) means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
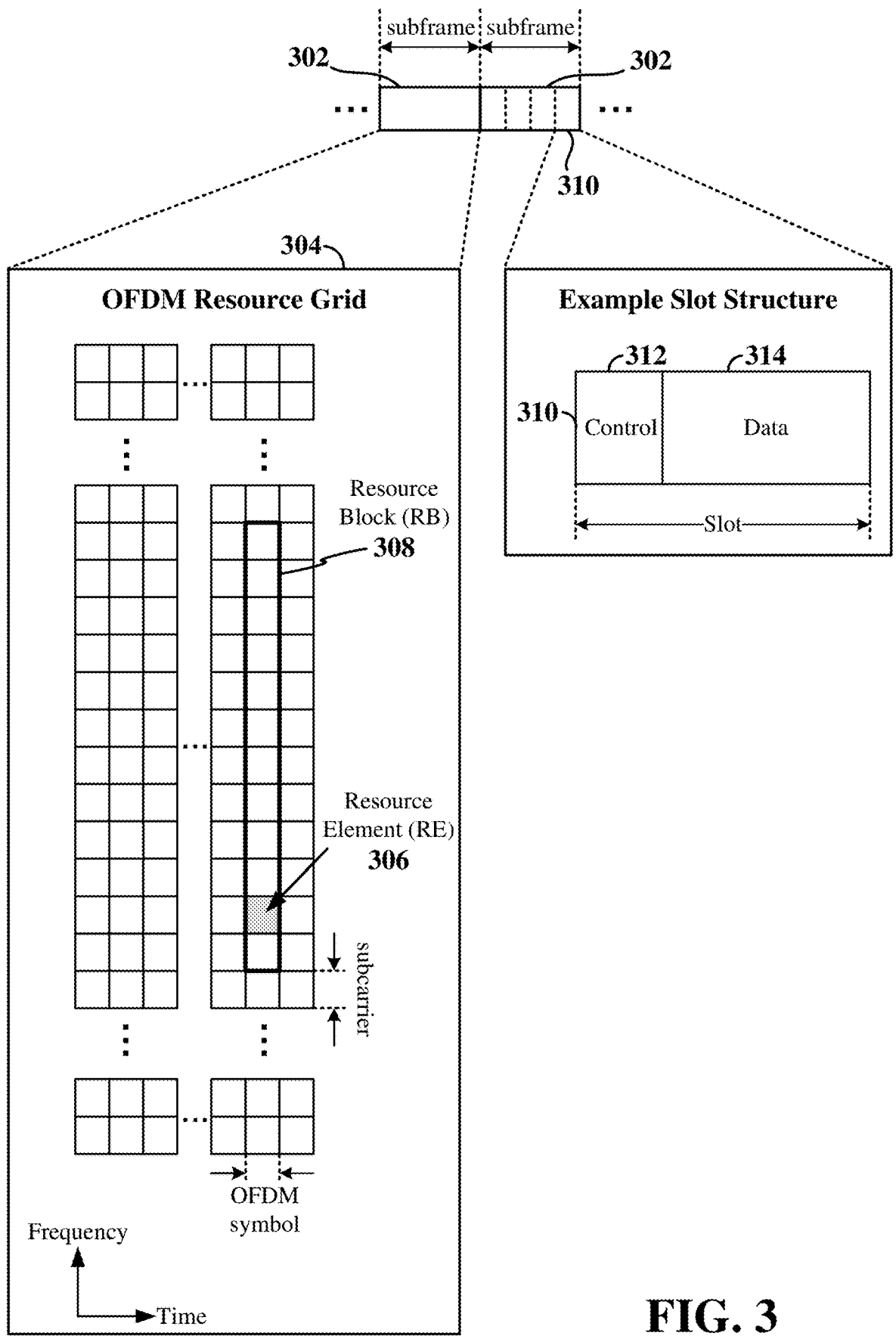
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., abase station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
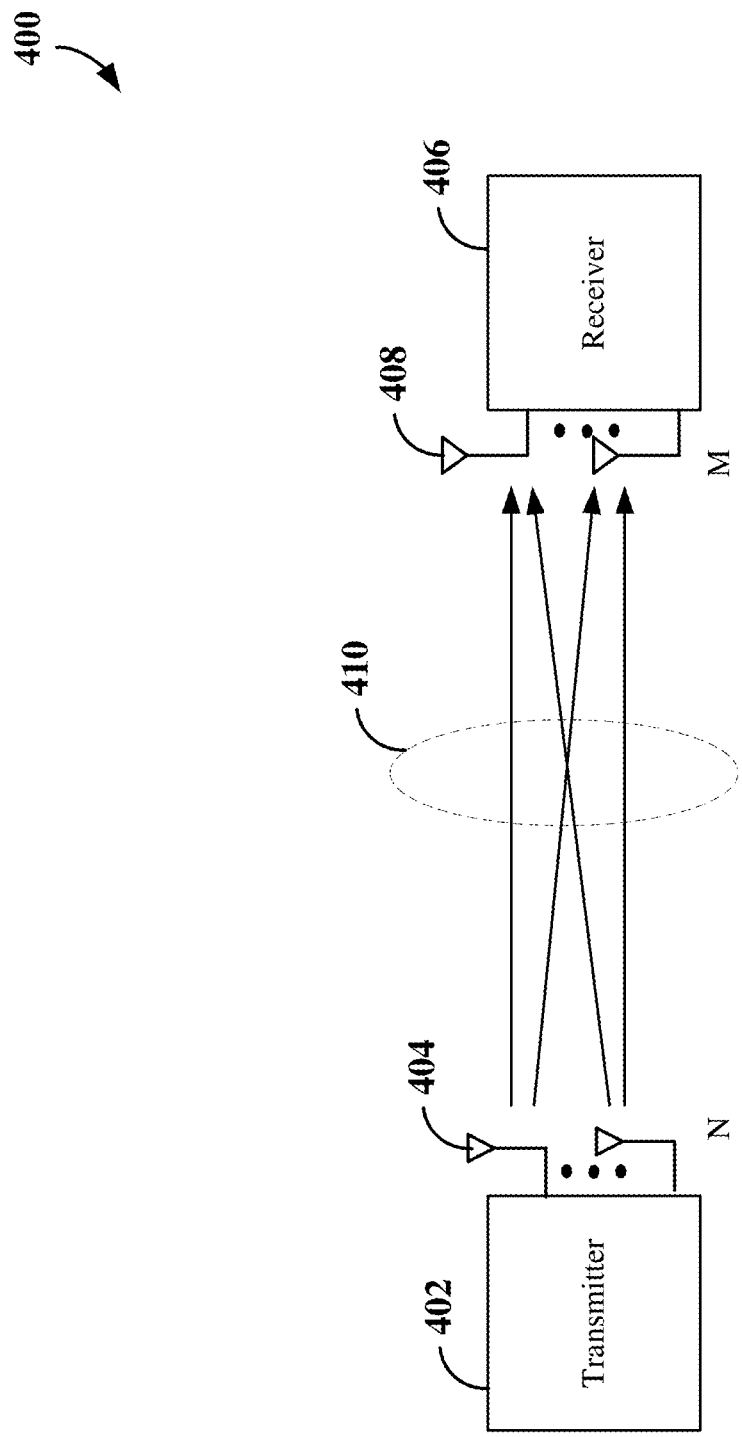
FIG. 4 is a block diagram illustrating an example of a wireless communication system supporting beamforming and/or multiple-input multiple-output (MIMO) communication according to some aspects.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity such as a UE, a scheduled entity such as a base station, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables a base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

The transmitter 402 and/or the receiver 406 may use beamforming to shape or steer an antenna beam (e.g., a transmit beam or a receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or the receiver 406 may apply amplitude and/or phase offsets to signals transmitted or received from each of the antennas 404 or 408 associated with the transmitter 402 or the receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, a slot format indicator (SFI), and paging information, may be transmitted in a beam-sweeping manner to enable all scheduled entities (e.g., UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., a gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or a CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
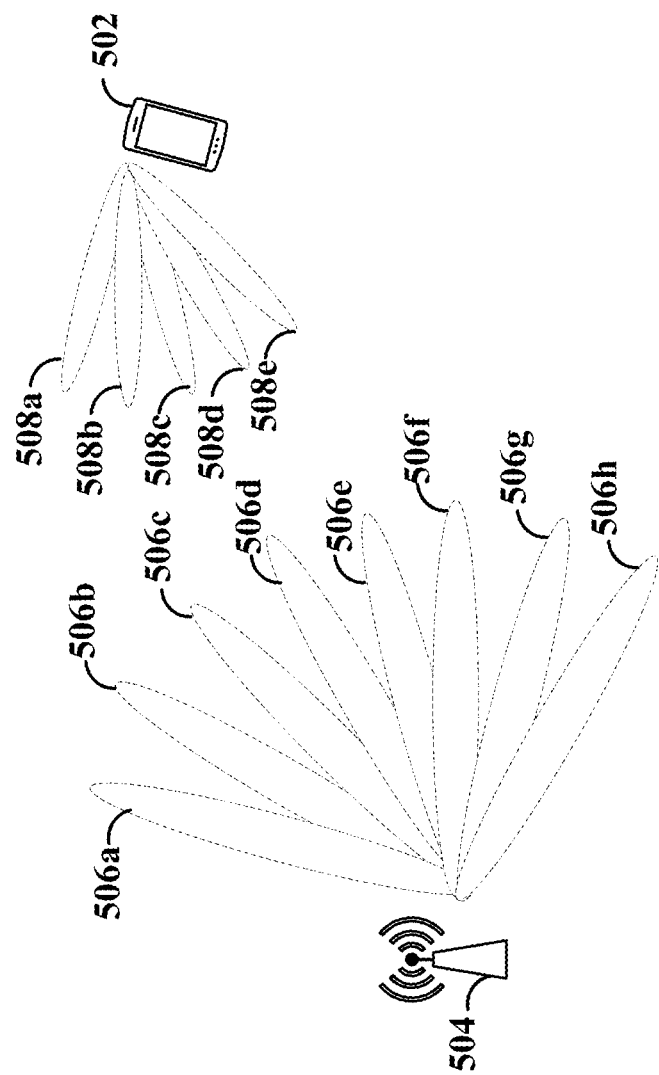
FIG. 5 is a diagram illustrating an example of communication between a radio access network (RAN) node and a wireless communication device using beamforming according to some aspects.

FIG. 5 is a diagram illustrating communication between a UE 502 and a base station 504 using beamformed signals according to some aspects. The UE 502 may be any of the UEs or scheduled entities illustrated in any of FIGS. 1, 2, 4, 5, 7A, 7B, 7C, 9, and 13. The base station 504 may be any of the base stations (e.g., gNBs) or scheduling entities illustrated in any of FIGS. 1, 2, 4, 5, 7A, 7B, 7C, 9, and 16.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or fewer beams distributed in all directions (e.g., 360 degrees).

The UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, reference signal received quality (RSRQ), etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report, including the respective beam index and beam measurement of each downlink transmit beam 506a-506h on each downlink receive beam 508a-508e, to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 508d and downlink receive beam 508c, and a third downlink BPL may include downlink transmit beam 508e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit an SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

In some other examples, the UE 502 may identify a new UL beam that may be paired with a current DL beam. For example, if the DL beam has a strong beam RSRP, then the UE may decide to keep the current DL beam and replace the current UL beam with the new UL beam. The decision on how beams are selected may be indicated by the base station or gNB to the UE. Alternatively or in addition, the UE may recommend a beam or BPL to the base station or gNB. In some examples, the UE may be configured with a look-up candidate beam pair table based on previous measurements, where the UE may recommend a new DL and UL beam pair for full-duplex communication. The gNB or base station may decide which beam to keep and which beam to replace among the DL and UL beams (e.g., keep the stronger beam and replace the weaker beam).

As mentioned above, a UE and a base station (e.g., gNB) may use full-duplex communication. FIG. 6A is a schematic diagram depicting an antenna array 600 of a TRP atop a base station 602 according to some aspects of the disclosure. The antenna array 600 is divided into two panels (panel 1 604, panel 2 606) with a physical separation 608 therebetween. Each of the two panels may be a subarray of antennas. A given panel may transmit and/or receive a beam or a beam group. A different number of panels may be used in other examples.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

FIG. 6B is a diagram depicting the transmission or reception configuration of the two panels (panel 1 604 and panel 2 606 of FIG. 6A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 6B.

At the left of FIG. 6B, when the antenna array 600 is communicating in only a single direction at a time, both panel 1 604 and panel 2 606 may be configured for the single-direction communication as an example of a TDD mode showing the DL transmission. For example, both panels 604 and 606 may be configured to transmit DL control 610, DL data 612, and DL data 613 as an example of DL transmissions during TDD mode. At the center of FIG. 6B, when the antenna array 600 is simultaneously transmitting a combination of DL data 615 and DL control 617 and receiving UL data (e.g., PUSCH 614) and UL control 618, panel 1 604 may be configured for DL transmission (i.e., TX) and panel 2 606 may be configured for UL reception (i.e., RX). At the right of FIG. 6B, when the antenna array 600 is only receiving UL data (e.g., PUSCH 620) and UL control 622, both panel 1 604 and panel 2 606 may be configured for UL reception. The antenna array 600 is thus configurable for both TDD and full-duplex operation (e.g., flexible TDD). The physical separation 608 between panel 1 604 and panel 2 606 may provide improved isolation between the panels (e.g., greater than about 50 dB of improved isolation) when compared to two panels without the physical separation 608. The above discussion also may be applicable to an antenna array in another type of device (e.g., a UE, with the references to DL and UL reversed).

Figure 7A:
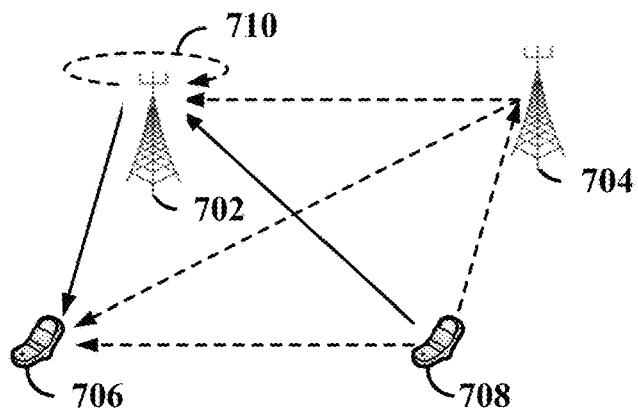
FIGS. 7A, 7B, and 7C are schematic illustrations of sources of interference for base stations and UEs according to some aspects.
Figure 7B:
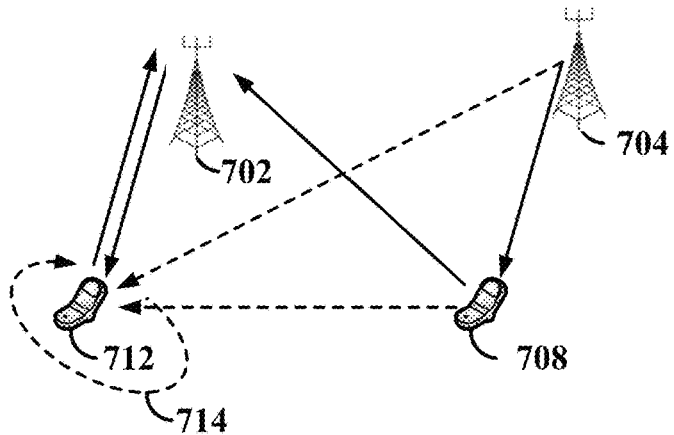
Figure 7C:
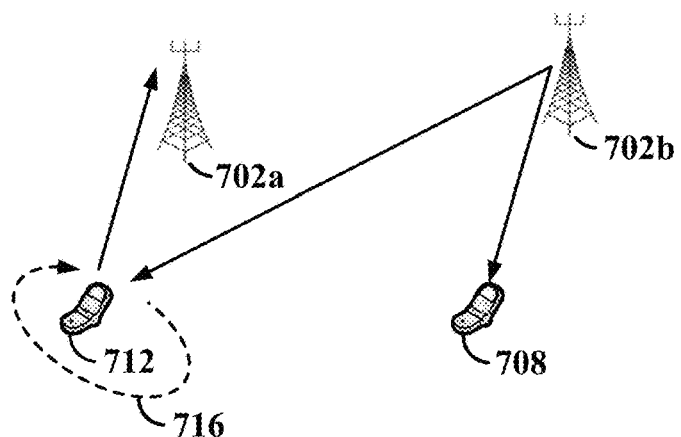

FIGS. 7A, 7B, and 7C illustrate wireless communication systems including a full-duplex gNB 702, a neighbor gNB 704, a half-duplex UE 706, a first full-duplex UE 712, a second full-duplex UE 708. These figures further illustrate different sources of interference (e.g., cross-beam interference) for the half-duplex UE 706, the first full-duplex UE 712, the second full-duplex UE 708, and different gNB configurations according to some aspects of the disclosure. The half-duplex UE 706, the first full-duplex UE 712, and the second full-duplex UE 708 may correspond to any of the UEs or scheduled entities shown in any of FIGS. 1, 2, 4, 5, 7A, 7B, 7C, 9, and 13.

In FIG. 7A, a full-duplex gNB 702 (e.g., a scheduling entity) is transmitting to the half-duplex UE 706. During the time of the transmission from the full-duplex gNB 702 to the half-duplex UE 706, the full-duplex gNB 702 is receiving, at its receiver (not shown), self-interference 710 from its own transmission to the half-duplex UE 706 as well as interference from the neighbor gNB 704 and an uplink transmission from a second full-duplex UE 708. The half-duplex UE 706 is also receiving interference from the second full-duplex UE 708 and the neighbor gNB 704. Because it is a half-duplex UE, the half-duplex UE 706 is not transmitting during the time of the transmission from the full-duplex gNB 702 to the half-duplex UE 706, and therefore, the half-duplex UE 706 receives no self-interference. The full-duplex gNB 702 and the neighbor gNB 704 may each correspond to any of the base stations or scheduling entities shown in any of FIGS. 1, 2, 4, 5, 7A, 7B, 7C, 9, and 16.

In FIG. 7B, the full-duplex gNB 702 is transmitting a downlink transmission to the first full-duplex UE 712. During the time of the transmission of the downlink transmission from the full-duplex gNB 702 to the first full-duplex UE 712, the full-duplex gNB 702 is receiving, at its receiver (not shown), a simultaneous uplink transmission from the first full-duplex UE 712. At the same time as the just mentioned simultaneous downlink and uplink transmissions, the first full-duplex UE 712 is receiving, at its receiver (not shown), self-interference 714 from its own transmission to the full-duplex gNB 702 as well as interference from the neighbor gNB 704 and interference from the second full-duplex UE 708.

FIG. 7C illustrates a full-duplex gNB configured as a multi-TRP base station including a first TRP 702a and a second TRP 702b. The first TRP 702a is receiving an uplink transmission from the first full-duplex UE 712. During the time of the transmission of the uplink transmission to the first TRP 702a, the first full-duplex UE 712 is also receiving a transmission from the second TRP 702b. In addition to the transmission received from the second TRP 718b, the first full-duplex UE 712 is also receiving, at its receiver (not shown), self-interference 716 from its own transmission to the first TRP 702a.

Conventionally, different frequency bands may be allocated for allocated for the transmissions of FIGS. 7A-7B to mitigate the above interference. For the half-duplex UE 706 of FIG. 7A, interference may be mitigated if the interference from the neighbor gNB 704 and second full-duplex UE 708 are at frequencies other than those occupied by the downlink transmission from the full-duplex gNB 702 to the half-duplex UE 706. Similarly, for the first full-duplex UE 712 of FIGS. 7B and 7C, interference may be mitigated if the self-interference 716 from the first full-duplex UE 712, interference from the neighbor gNB 704, and/or interference from the second full-duplex UE 708 are at frequencies other than those occupied by the downlink transmission from the full-duplex gNB 702 to the half-duplex UE 706.

The disclosure relates in some aspects to FD capabilities for wireless communication and interference mitigation for FD communication. Various aspects of the disclosure may be applicable to FD operation with simultaneous uplink transmissions and downlink transmissions in FR2 and/or other frequency bands, which may be referred to herein as "FD mode." FD mode may include SBFD in flexible TDD, but may also include FDD in paired spectrum, SBFD in unpaired spectrum, partially overlapped frequency spectrum FD, fully overlapped frequency spectrum FD, in-band FD, or other types of full-duplex operation.

This FD capability may be implemented at a base station (e.g., a gNB), a UE, or both. For example, a UE may transmit uplink signals from one panel and receive downlink signals at another panel.

In some aspects, full-duplex performance may depend on beam separation and/or other factors. For example, a first pair of beams that has more spatial separation than a second pair of beams may have less self-interference than the second pair of beams.

In some aspects, FD capability may improve (e.g., reduce) latency. For example, in contrast with half-duplex communication where only some of the slots are reserved for uplink transmission, in FD communication a UE might not need to wait for an available uplink slot to transmit uplink information, thereby reducing the latency for the uplink transmission. As another example, a UE may receive downlink signals in slots that are dedicated as uplink-only slots, thereby reducing the latency for the downlink transmission.

In some aspects, FD capability may improve spectrum efficiency (e.g., per cell, per UE, etc.). For example, in FD communication, the same time slots and/or frequency resources may be used concurrently for uplink and downlink transmissions. Here, the downlink frequency band(s) and the uplink frequency band(s) in FD communication may be fully overlapped, partially overlapped, or separated with a guard band in between.

In a full-duplex scenario in FR2 (or other beamforming scenarios), a beam may be subject to failure in some circumstances. For example, a UE may experience beam failure if the radio conditions suddenly change (e.g., when an end-user steps around a corner or a vehicle causes an obstruction), whereby one or more of the beams used by the UE may become unreliable before the UE is able to switch to a new beam.

In some examples, a beam failure may be detected by repeatedly performing beam measurements. For example, a physical (PHY) layer of a UE may conduct radio link monitoring (RLM) measurements (e.g., for the downlink) on RLM reference signals (RLM-RSs). In some examples, downlink RLM-RSs may include SSBs and CSI-RSs. In some examples, uplink RLM-RSs may include SRSs and DMRSs.

The PHY layer may pass the results of these measurements to a medium access control (MAC) layer and/or to a radio resource control (RRC) layer. In some examples, the RRC layer may be responsible for detecting a radio link failure (RLF) while the MAC layer may be responsible for detecting a beam failure.

The PHY layer may use a quality threshold to trigger failure indications to the MAC layer. As a specific example, the 3GPP Technical Specification (TS) 38.133 v15.8.0, section 8.5.1 (2019-12) specifies a Qout_LR parameter. This parameter specifies a quality whereby, for any monitored RLM-RSs that fall below this quality, the PHY layer is to generate a beamFailureinstance parameter. The MAC layer may then use this indication in combination with a beamFailureInstanceMaxCount parameter and a beamFailureDetectionTimer parameter for beam failure detection.

Once a UE detects a beam failure, the UE may attempt a recovery operation by initiating a RACH procedure. For example, the UE may initiate a contention-free random access (CFRA) procedure with a configured beam failure recovery-information element (BFR-IE).

Before transmitting a RACH preamble during the RACH procedure, a UE may identify a new target beam based on measurements of one or more candidate beams. Here, the UE may measure the reference signal received power (RSRP) or some other quality of the candidate beams and select the candidate beam with the best quality (e.g., highest RSRP). The UE may thus use the selected beam for the RACH procedure for beam failure recovery. In some examples, a base station may transmit an IE RadioLinkMonitoringConfig (e.g., as shown in Table 1 below) to a UE to configure the radio link monitoring for detection of beam failure and/or cell radio link failure. As shown in Table 1, the IE RadioLinkMonitoringConfig specifies the resources (e.g., SSB resources or CSI-RS resources) that the UE is to monitor for beam quality measurement operations. In addition, the IE RadioLinkMonitoringConfig specifies a beamFailureInstanceMaxCount parameter and a beamFailureDetectionTimer parameter that a UE uses to determine whether to initiate a beam failure recovery operation. For example, if a UE detects that a measured RSRP of a beam falls below a threshold a beamFailureInstanceMaxCount number of times within a period of time specified by the beamFailureDetectionTimer parameter, the UE may initiate a beam failure recovery operation.

TABLE 1

RadioLinkMonitoringConfig information element

```
-- ASN1START
-- TAG-RADIOLINKMONITORINGCONFIG-START
RadioLinkMonitoringConfig ::=      SEQUENCE {
     failureDetectionResourcesToAddModList
          SEQUENCE (SIZE(1..maxNrofFailureDetectionResources))
          OF RadioLinkMonitoringRS
             OPTIONAL, -- Need N
```

TABLE 1-continued

RadioLinkMonitoringConfig information element

```
    failureDetectionResourcesToReleaseList
            SEQUENCE (SIZE(1..maxNrofFailureDetectionResources))
            OF RadioLinkMonitoringRS-Id
                OPTIONAL, -- Need N
    beamFailureInstanceMaxCount
            ENUMERATED {n1, n2, n3, n4, n5, n6, n8, n10}
                OPTIONAL, -- Need R
    beamFailureDetectionTimer
            ENUMERATED {pbfd1, pbfd2, pbfd3, pbfd4, pbfd5, pbfd6,
            pbfd8, pbfd10}
                                            OPTIONAL,       --
            Need R
    ...
}
RadioLinkMonitoringRS ::=     SEQUENCE {
    radioLinkMonitoringRS-Id        RadioLinkMonitoringRS-Id,
    purpose                            ENUMERATED{beamFailure,   rlf,
both},
    detectionResource               CHOICE {
        ssb-Index                         SSB-Index,
        csi-RS-Index               NZP-CSI-RS-ResourceId
    },
    ...
}
-- TAG-RADIOLINKMONITORINGCONFIG-STOP
-- ASN1STOP
```

Figure 8:
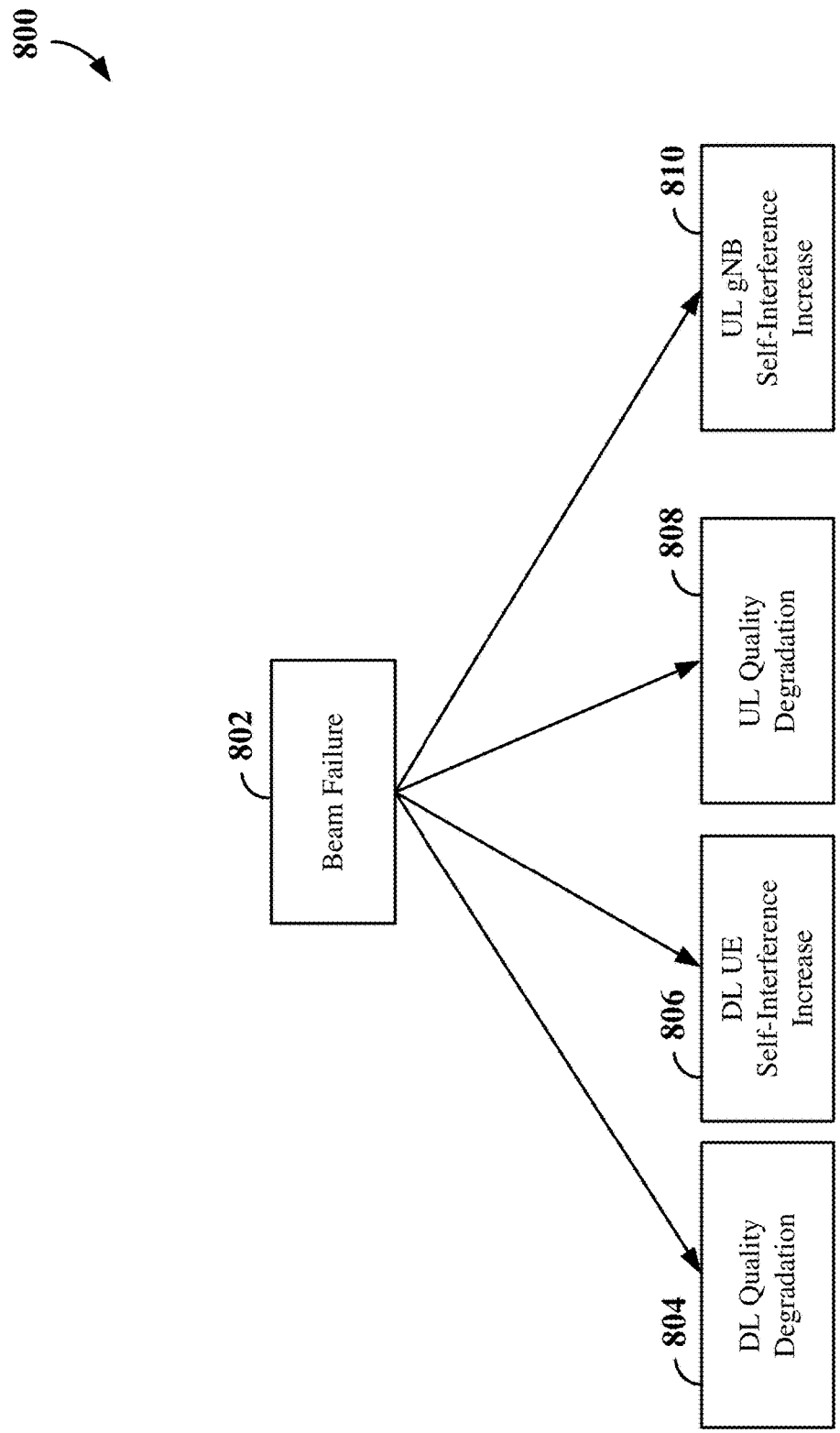
FIG. 8 is a conceptual illustration of beam failure examples according to some aspects.

As mentioned above, a beam failure may be caused by a degradation in downlink quality or a degradation in uplink quality. For full-duplex operation, however, causes of beam failure may also include a downlink beam failure due to an increase in UE self-interference (e.g., reflections and/or dynamic clutter due to environment changes) or an uplink beam failure due to an increase in base station (e.g., gNB) self-interference. Accordingly, as shown in the diagram 800 of FIG. 8, in some examples, a beam failure 802 may be due to one or more of a DL quality degradation 804, a DL UE self-interference increase 806, an UL quality degradation 808, or an UL gNB self-interference increase 810.

The disclosure relates in some aspects to beam failure detection that accounts for self-interference in a full-duplex scenario. The procedures and signaling discussed below may be applicable to detecting downlink beam failure and/or uplink beam failure.

Figure 9:
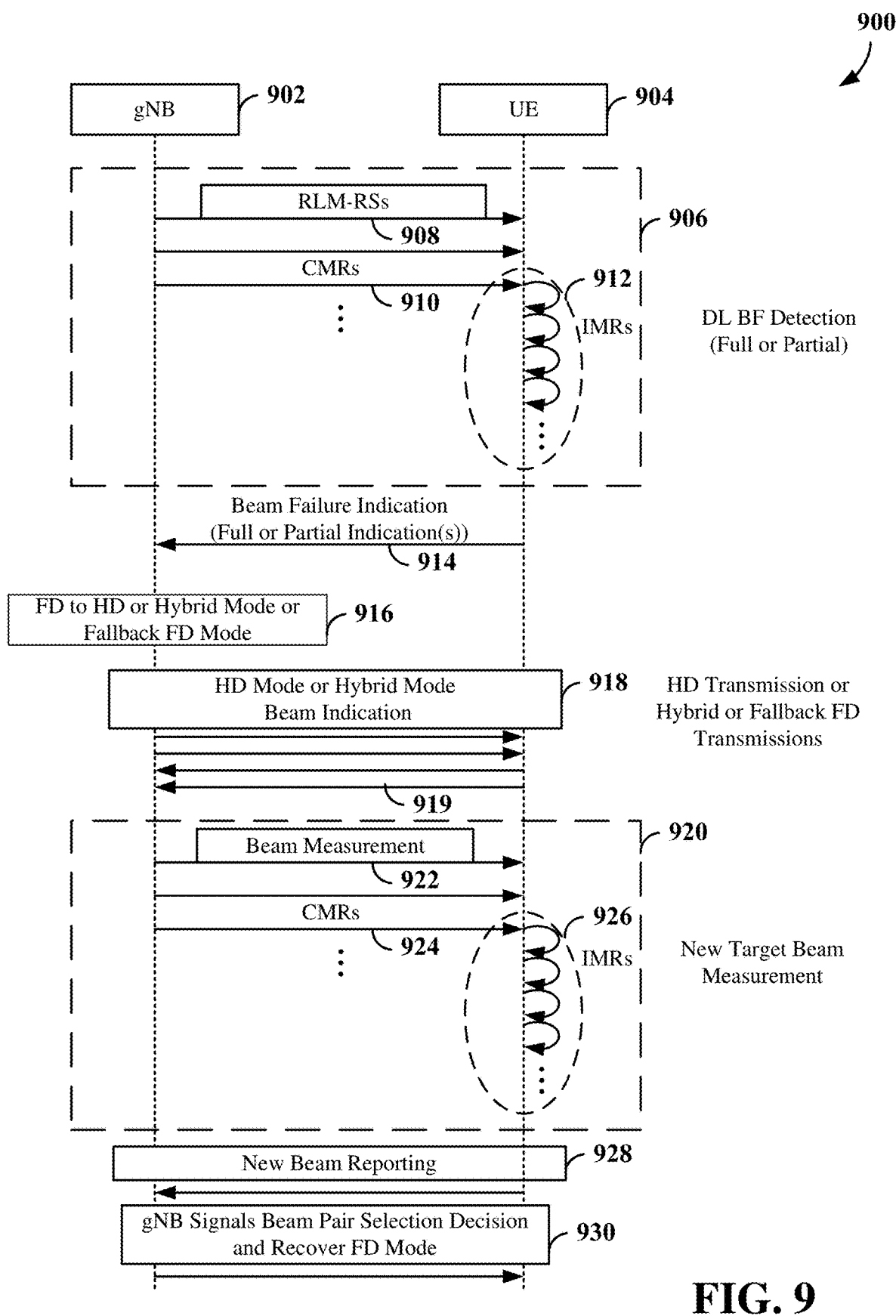
FIG. 9 is a signaling diagram illustrating example beam failure-related signaling between a UE and a gNB according to some aspects.

FIG. 9 illustrates an example of failure detection procedures and signaling 900 in a wireless communication system that includes a gNB 902 and a UE 904. For purposes of explanation, FIG. 9 relates to detection of a downlink beam failure. It should be appreciated that the disclosed techniques may also be applicable to detection of an uplink beam failure. The UE 904 may correspond to any of the UEs or scheduled entities shown in FIGS. 1, 2, 4, 5, 7A, 7B, 7C, 9, and 13. The gNB 902 may correspond to any of the base stations or scheduling entities shown in FIGS. 1, 2, 4, 5, 7A, 7B, 7C, 9, and 16.

Block 906 of FIG. 9 describes several operations for detecting a downlink beam failure. This beam failure may be a full failure (e.g., all monitored beams failed) or a partial failure (e.g., not all of the monitored beams failed).

During a measurement procedure, the gNB 902 transmits RLS-RSs on at least one channel measurement resource (CMR) as generally represented by lines 908-910. For example, the gNB may transmit SSB or CSI-RS on the CMRs designated by the gNB 902 for downlink beam measurements (e.g., in a RadioLinkMonitoringConfig IE).

In addition, the UE 904 transmits and monitors uplink reference signals (generally represented by the looped arrows in FIG. 9) on interference measurement resources (IMRs) generally represented by the dashed oval 912. For example, a first panel of the UE 904 may transmit sounding reference signals (SRSs) or demodulated reference signals (DMRSs) on the IMRs designated by the gNB 902 for self-interference measurements (e.g., in a RadioLinkMonitoringConfig IE) and a second panel of the UE 904 may measure and monitor for the SRSs or DMRSs on the IMRs. In FIG. 9, the monitoring of uplink reference signals by the UE 904 is represented by the arrows that loop back to the UE 904.

In some examples, a beam failure in a full-duplex communication scenario may be detected based on a signal-to-interference-plus-noise ratio (SINR). For example, the UE 904 may calculate an SINR parameter based on the measured downlink reference signals and the measured uplink reference signals. The UE may then determine whether the quality of the downlink indicates a beam failure (e.g., by comparing the SINR or a block error rate based on the SINR to a threshold).

Upon detection of a beam failure, the UE may generate an indication of the beam failure. In some examples, the beam failure indication indicates that all of the beams monitored by the UE have failed. In some examples, the beam failure indication indicates that one or more of the beams monitored by the UE have failed. In this latter case, the beam failure indication may include an identifier of each failed beam.

The UE 904 transmits the beam failure indication 914 (e.g., a beam failure recovery request) to the gNB 902. The manner in which the UE 904 transmits the beam failure indication 914 may depend on whether an uplink from the UE 904 to the gNB 902 is currently working. If the uplink is working, the UE 904 may transmit the beam failure indication 914 via uplink signaling (e.g., via a physical uplink control channel or a physical uplink shared channel). If the uplink is not working, the UE 904 may transmit the beam failure indication 914 via a random access channel (RACH) message. The beam failure indication 914 may indicate that all of the beams monitored by the UE 904 have failed or that one or more of the beams monitored by the UE 904 have failed. Also, the beam failure indication 914 may indicate whether the beam failure is due to, for example, downlink quality degradation and/or UE self-interference.

In some examples, the UE 904 may determine whether a beam failure is due to downlink degradation or UE self-interference by initially measuring only downlink reference signals to determine whether deterioration in the downlink quality was sufficient on its own to cause the beam failure. If the deterioration in the downlink quality was sufficient to cause the beam failure, the UE 904 and/or the gNB 902 may take temporary remedial measures to address the deterioration in the downlink quality (e.g., by selecting a different downlink beam). On the other hand, if the beam failure was caused by UE self-interference, the UE 904 and/or the gNB 902 may take steps to temporarily address the UE self-interference (e.g., by switching to half-duplex (HD) operation or some other mode of operation as will be discussed in more detail below and eventually returning the operation to a full-duplex communication mode).

After receiving the beam failure indication 914 (indicating a full or partial beam failure), the gNB 902 may initiate a process 916 to modify the FD communication mode according to various different modes and conditions. In an example, the gNB 902 may initiate a half-duplex (HD) communication mode for one or more active beams, particularly in the case of a full failure indication. It is noted here that an active beam is a beam that is selected by the gNB for data and control channel transmissions and may further be beams selected from among the UE selected and reported good candidate beams. In some examples, the active beams may be the selected CORESET beams (e.g., two CORESET beams or some other number of CORESET beams).

In another example, the gNB 902 may initiate a hybrid mode, particularly in the case of a partial failure indication. The hybrid mode may include operating one or more working beams according to FD communication, where the failed beams are switched to HD communication mode operation. In still a further aspect, the process 916 may include switching to a fallback or limited FD mode, where the process falls back to FD operation, but in a limited FD operation mode as will be discussed in more detail later. The limited or fallback FD mode may include implementation of a UL power backoff for particular traffic cases such as low priority of the UL traffic or lower modulation coding schemes (MCS). The power backoff may be accompanied by UL repetition (e.g., repeat transmissions of particular data/control channels). In other aspects, the limited FD mode may include replacing a failed FD beam pair with a backup FD pair regardless of the traffic priority.

After selection of one of the various temporary or modified communication modes in the process 916, the selected communication mode (HD, Hybrid, or Fallback/Limited FD modes) may be communicated or indicated to the UE 904 as shown by block 918. Based on the selected communication mode, either HD, limited FD, or hybrid communication takes place as indicated by arrows 919 (which may be HD or FD communication according to the particular characteristics of the selected mode).

After a predetermined period of operation of the temporary communication mode operation as indicated by the arrows 919, a new target beam measurement operation shown at block 920 is implemented.

Block 920 of FIG. 9 describes example operations for a new target beam measurement that involves the UE 904 determining new candidate beams and reporting the beams to the gNB 902. During a measurement procedure, the gNB 902 transmits beam measurements on channel measurement resources (CMRs) generally represented by lines 922-924. For example, the gNB may transmit SSB or CSI-RS on the CMRs designated by the gNB 902 for downlink candidate beam measurements. In addition, the UE 904 transmits and monitors uplink reference signals (as represented by the looped arrows in FIG. 9) on IMRs generally represented by the dashed oval 926. For example, a first panel of the UE 904 may transmit sounding reference signals (SRSs) on the IMRs designated by the gNB 902 for cross beam self-interference measurements and a second panel of the UE 904 may measure and monitor for the SRSs on the IMRs.

Upon detection of a beam failure, the UE may generate an indication of the beam failure. In some examples, the beam failure indication indicates that all of the beams monitored by the UE have failed. In some examples, the beam failure indication indicates that one or more of the beams monitored by the UE have failed. In this latter case, the beam failure indication may include an identifier of each failed beam.

In some examples, a beam measurement to determine signal quality in a full-duplex communication scenario may involve measuring a signal-to-interference-plus-noise ratio (SINR). For example, the UE 904 may calculate an SINR parameter based on the measured downlink reference signals and the measured uplink reference signals. The UE may then determine the quality of the downlink (e.g., by comparing the SINR or a block error rate based on the SINR to a threshold). The UE may then identify candidate target beams or beam pairs for a new connection based on the measurements (e.g., by selecting a beam associated with the highest SINR). In some examples, the UE can identify DL beams paired with at least one current UL beam, and may measure candidate DL beams (e.g., up to 64 beams).

In some examples, instead of measuring signal quality in terms of RSRP and/or a signal-to-noise ratio (SNR) as may be done for conventional measurements, the UE may measure SINR, taking self-interference into consideration. For example, the UE may use the IMRs to measure self-interference from each of the one or more active UL beams to each candidate DL beam. Based on these measurements (e.g., upon identifying a beam associated with the highest SINR), the UE may identify a new target DL beam to be paired with a current UL beam in some examples.

In some examples, the UE may identify a new UL beam that may be paired with a current DL beam. For example, if the DL beam has a strong beam RSRP, then the UE may decide to keep the current DL beam and replace the current UL beam with the new UL beam. The decision on how beams are selected may be indicated by the gNB to the UE. Alternatively or in addition, the UE may recommend a beam or BPL to the gNB. In some examples, the UE may be configured with a look-up candidate beam pair table based on previous measurements, where the UE may recommend a new DL and UL beam pair for full-duplex communication. The gNB may decide which beam to keep for use and which beam to replace among the DL and UL beams (e.g., keep the stronger beam and replace the weaker beam). In cases where different UL beams are used for receiving DL transmissions and transmitting UL transmissions, the UE may switch one or both of these beams in some examples.

At block 928, the UE may generate and transmit new beam reporting information indicating the recommended new DL and/or UL beams to the gNB 902, based on the new target measurements determined at block 920. At block 930, the gNB signals a new beam pair selection decision to the UE 904 and recovers the full-duplex mode.

Figure 10:
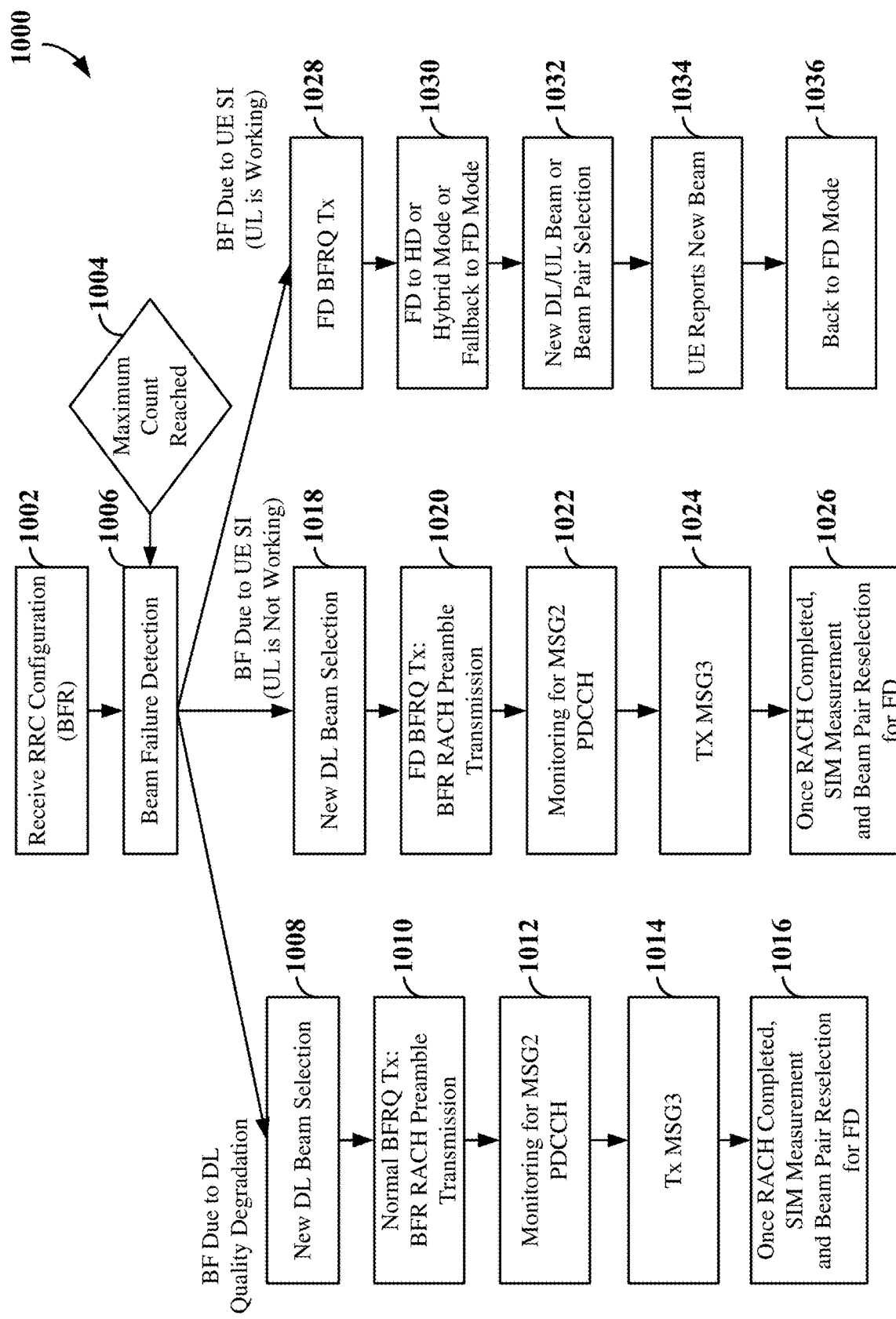
FIG. 10 is a flow chart of example beam failure-related operations according to some aspects.

As mentioned above, a beam failure may be based on downlink signal degradation and/or UE self-interference and a UE might or might not have a working uplink to its serving gNB. FIG. 10 illustrates different beam failure-related procedures that may be employed for these different scenarios.

At block 1002, a UE receives an RRC configuration (e.g., a RadioLinkMonitoringConfig IE). For example, the UE may receive a configuration that specifies the parameters to be used for beam failure detection and beam failure recovery (e.g., a beamFailureInstanceMaxCount parameter, a beamFailureDetectionTimer parameter, an indication of CMRs, an indication of IMRs, etc.).

At block 1004, at some point int time, the UE determines whether the beam failure maximum count has been reached. As discussed herein, in some examples, the UE may determine whether an RSRP or an SINR measurement of a beam (or a set of beams) falls below a threshold a beamFailureInstanceMaxCount number of times within a period of time specified by the beamFailureDetectionTimer parameter.

If the maximum count is reached, the UE initiates a beam failure detection operation at block 1006. As discussed herein, the UE may indicate to a gNB whether the beam failure is due to downlink quality degradation or self-interference. In addition, if the uplink is working, the UE may send a beam failure recovery request to the gNB via uplink signaling. Conversely, if the uplink is not working, the UE may send a beam failure recovery request to the gNB via a RACH message.

The remaining blocks of FIG. 10 illustrate different beam failure recovery procedures for these different scenarios. Specifically, blocks 1008-1016 describe beam failure recovery procedures for a beam failure due to downlink quality degradation, blocks 1018-1026 describe beam failure recovery procedures for a beam failure due to UE self-interference when the uplink is not working, and blocks 1028-1036 describe beam failure recovery procedures for a beam failure due to UE self-interference when the uplink is working, as will be discussed in more detail below.

If the beam failure is due to downlink quality degradation, at block 1008, the UE initiates a new beam selection procedure. At blocks 1010-1016, the UE performs a RACH procedure. For example, the UE may conduct a conventional beamforming request (BFRQ) procedure that involves a beamforming recovery (BFR) RACH preamble transmission at block 1010, monitoring for a response from the gNB via a RACH MSG2 PDCCH at block 1012, and sending a response to the gNB via a RACH MSG3 at block 1014. Once the RACH procedure is completed, the UE may engage in self-interference measurement and beam pair reselection for full-duplex communication recovery at block 1016.

If the beam failure is due to UE self-interference and the uplink is not working, at block 1018, the UE initiates a new beam selection procedure. At blocks 1010-1016, the UE performs a RACH procedure. For example, the UE may conduct a conventional beamforming request (BFRQ) procedure that involves a beamforming recovery (BFR) RACH preamble transmission at block 1020, monitoring for a response from the gNB via a RACH MSG2 PDCCH at block 1022, and sending a response to the gNB via a RACH MSG3 at block 1024. Once the RACH procedure is completed, the UE may engage in self-interference measurement and beam pair reselection for full-duplex communication recovery at block 1066.

If the beam failure is due to UE self-interference and the UL is working, the UE may transmit a FD BFRQ at block 1028 and, at block 1030, engage in a temporary modification of the communication mode to remediate the effects of beam failure and eventually restore the operation to a FD communication mode as discussed above. At block 1032, the UE may perform self-interference measurements and determine new DL and/or UL beam or beam pair selection candidates, and then report the new beam candidates at block 1034. After receiving the new beam selection from the gNB, the UE may return back to full-duplex mode at block 1036. As mentioned above, aspects of the processes for switching to HD, hybrid HD, and limited FD modes may be implemented in a base station or gNB, a UE, or some combination thereof.

As mentioned above, the disclosure relates in some aspects to downlink beam failure detection for a scenario where the downlink beam failure is due to self-interference and/or due to downlink quality degradation. In contrast with conventional downlink beam failure detection that may be based on downlink signal-to-noise ratio (SNR) measurement or RSRP measurements, for full-duplex operation, downlink beam failure detection may be based on SINR measurements by a UE (e.g., using IMRs for self-interference measurements). As mentioned above, if an SINR measurement for a beam does not meet an SINR threshold, the PHY layer may generate a beamFailureinstance indication and send the indication to the MAC layer along with the beamFailureInstanceMaxCount and beamFailureDetectionTimer information.

In some examples (e.g., Option 1), the beamFailureinstance indication is a full failure indication. Here, the indication may indicate that all monitored RLM-RSs fall below a threshold. Thus, the UE may be triggered to generate a beamFailureinstance indication to the MAC layer in this case upon determining that every monitored beam has failed.

In some examples, (e.g., Option 2), the beamFailureinstance indication is a partial failure indication. Here, the indication may indicate that less than all of the monitored RLM-RSs fall below a threshold. For example, if there are two active CORESET beams for the UE and one of the CORESET beams fails, UE may be triggered to generate a beamFailureInstance indication to the MAC layer. For the latter example, the MAC layer may maintain different counters and detection timers for different active beams.

In some examples, a UE may determine whether a beam failure is caused by a downlink quality degradation or self-interference. For example, a UE may detect a beam failure caused by a downlink quality degradation based on CMR measurements only. Conversely, a UE may detect a beam failure caused by self-interference detected based on CMR measurements and IMR measurements.

In view of the above, an RLM-RS configuration for full-duplex beam measurements may specify two categories of reference signals: one for CMRs (e.g., SSB or CSI-RS) and one for IMRs (e.g., SRS or DMRS). Table 2 illustrates an example of an IE RadioLinkMonitoringConfig that includes this additional information. As shown, the IE RadioLinkMonitoringConfig may specify CMR resources (e.g., SSB resources or CSI-RS resources) that the UE is to monitor for downlink beam quality measurement operations. In addition, the IE RadioLinkMonitoringConfig may specify IMR resources (e.g., SRS resources) that the UE is to use for self-interference measurement operations.

TABLE 2

| RadioLinkMonitoringConfig information element |
| --- |

```
-- ASN1START
-- TAG-RADIOLINKMONITORINGCONFIG-START
RadioLinkMonitoringConfig ::=            SEQUENCE {
    failureDetectionResourcesToAddModList
              SEQUENCE (SIZE(1..maxNrofFailureDetectionResources))
              OF RadioLinkMonitoringRS
                  OPTIONAL, -- Need N
    failureDetectionResourcesToReleaseList
              SEQUENCE (SIZE(1..maxNrofFailureDetectionResources))
              OF RadioLinkMonitoringRS-Id
                  OPTIONAL, -- Need N
    beamFailureInstanceMaxCount
              ENUMERATED {n1, n2, n3, n4, n5, n6, n8, n10}
                  OPTIONAL, -- Need R
    beamFailureDetectionTimer
              ENUMERATED {pbfd1, pbfd2, pbfd3, pbfd4, pbfd5, pbfd6,
              pbfd8, pbfd10}
                                                  OPTIONAL,      --
              Need R
    ...
}
RadioLinkMonitoringRS ::=         SEQUENCE {
    radioLinkMonitoringRS-Id         RadioLinkMonitoringRS-Id,
    purpose                          ENUMERATED{beamFailure,  rlf,
both},
    CMRs:
        detectionResource                  CHOICE {
            ssb-Index                          SSB-Index,
            csi-RS-Index                   NZP-CSI-RS-ResourceId
    },
    IMRs:
        detectionResource                  CHOICE {
            srs-Index                          SRS-ResourceId
    },
    ...
}
-- TAG-RADIOLINKMONITORINGCONFIG-STOP
-- ASN1STOP
```

Figure 11:
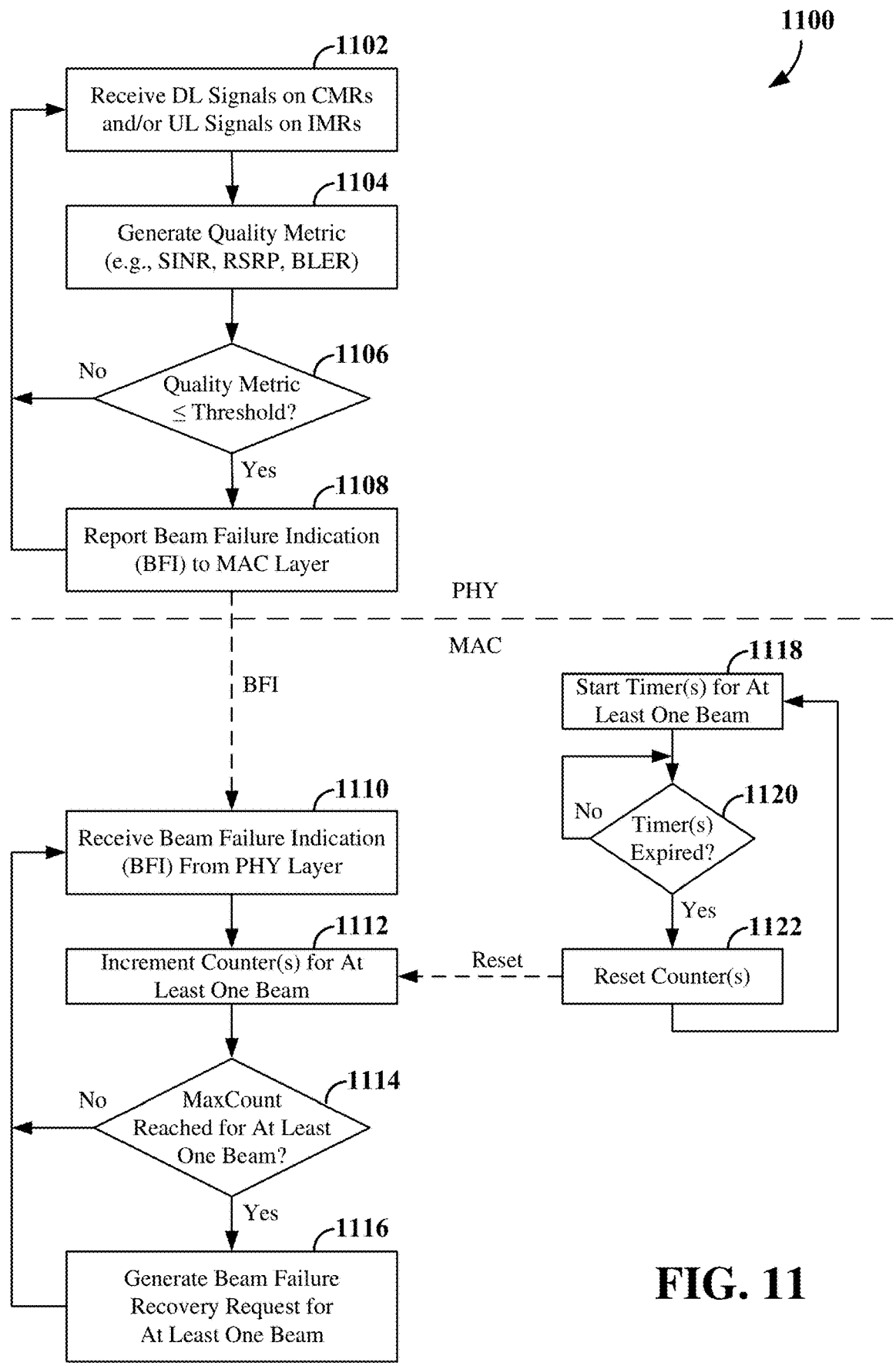
FIG. 11 is a flow chart of example beam failure detection operations according to some aspects.

FIG. 11 is a flow chart illustrating an example beam failure recovery method 1100 for a device in accordance with some aspects of the present disclosure. As described below, some or all illustrated features may be omitted in a particular implementation within the scope of the present disclosure, and some illustrated features may not be required for implementation of all examples. In some examples, one or more operations for the method 1100 may be carried out by a UE or a base station (e.g., a gNB). In some examples, the method 1100 may be carried out by any suitable apparatus or means for carrying out the functions or algorithm described below.

In the example of FIG. 11, blocks 1102 to 1108 describe measurement-related operations that may be performed at a PHY layer of the device, while blocks 1110 to 1122 describe beam failure-related operations that may be performed at a MAC layer of the device. One or more of these operations could be performed at a different protocol layer in other examples.

At block 1102, the device (e.g., a UE or gNB) may receive downlink signals on CMRs and/or receive uplink signals on IMRs according to a schedule specified by a gNB (e.g., the schedule may specify the time slots and frequency bands to use for beam measurements). For example, to determine whether there is a beam failure due to downlink quality degradation, a UE may measure SSBs or CSI-RSs from a gNB. In addition, to determine whether there is a beam failure due to self-interference by the UE, the UE may measure SSBs or CSI-RSs from a gNB and measure SRSs or DMRSs transmitted by the UE. As another example, to determine whether there is a beam failure due to uplink quality degradation, a gNB may measure SRSs or DMRSs transmitted by a UE. Also, to determine whether there is a beam failure due to self-interference by the gNB, the gNB may measure SRSs or DMRSs transmitted by a UE and measure SSBs or CSI-RSs transmitted by the gNB.

At block 1104, the device generates a quality metric for a given signal measurement. In some examples, a UE may measure the RSRP of a received downlink reference signal. In this case, the quality metric could simply be the measured RSRP.

In some examples, a UE may combine its measurements of a downlink reference signal and an uplink reference signal to measure an SINR quality metric for the downlink reference signal. Here, a first panel of the UE may transmit the uplink reference signal and a second panel of the UE may measure the downlink reference signal transmitted by the gNB and the uplink reference signal transmitted by the first panel.

In some examples, a UE may calculate a block error rate (BLER) quality metric based on a measured SINR or some other parameter. In some examples, the SINR may be defined as the signal strength measured on CMRs divided by the sum of the interference strength (e.g., self-interference measured on IMRs) and the strength of background noise. In some cases, the background noise may be assigned a fixed value.

In some examples, a gNB may measure the RSRP of a received uplink reference signal. In this case, the quality metric could simply be the measured RSRP.

In some examples, a gNB may combine its measurements of an uplink reference signal and a downlink reference signal to measure an SINR quality metric for the uplink signal. Here, a first panel of the gNB may transmit the downlink reference signal and a second panel of the gNB may measure the uplink reference signal transmitted by a UE and the downlink reference signal transmitted by the first panel.

In some examples, a gNB may calculate a block error rate (BLER) quality metric based on a measured SINR or some other parameter. In some examples, the SINR may be defined as the signal strength measured on IMRs divided by the sum of the interference strength (e.g., self-interference measured on CMRs) and the strength of background noise. In some cases, the background noise may be assigned a fixed value.

At block 1106, the device determines whether the quality metric (e.g., RSRP, SINR, or BLER) is less than or equal to a threshold. In some examples, the threshold may correspond to a BLER of 10%. Other thresholds may be used in other examples. If the quality metric is not less than or equal to a threshold, the operational flow proceeds back to block 1102 where the device continues monitoring for reference signals.

On the other hand, if the quality metric is less than or equal to a threshold at block 1106, the operational flow proceeds to block 1108. At block 1108, the device reports a beam failure indication to the MAC layer. The operational flow for the PHY layer then proceeds back to block 1102 and the operations are repeated for the next set of measurements. Thus, each time a beam failure is detected at the PHY layer, the PHY layer sends a beam failure indication to the MAC layer.

The beam failure indication may indicate beam failure of one beam or multiple beams. For the full failure indication discussed above, the operations of blocks 1102 to 1106 may be performed for each of the active beams of the device. In this case, the PHY layer may send the beam failure indication if all of the beams failed (e.g., the quality metric for each beam fell below the threshold). For the partial failure indication discussed above, the operations of blocks 1102-1108 may be performed independently for each of the active beams of the device. In this case, the PHY layer may send the beam failure indication if one of the beams failed (e.g., the quality metric for that beam fell below the threshold), including an identifier of the failed beam.

The operations of blocks 1110 to 1114 are performed at the MAC layer of the device every time the MAC layer receives a beam failure indication from the PHY layer.

At block 1110, the MAC layer receives a particular instance of a beam failure indication from the PHY layer.

At block 1112, the device increments a counter as a result of receiving the beam failure indication. For the full failure indication discussed above, the counter may keep track of the number of times all of the beams failed. For the partial failure indication discussed above, the counter may keep track of the number of times a particular beam failed. In this latter case, the MAC layer may maintain separate counters for different beams (e.g., counter 1 for beam 1, counter 2 for beam 2, etc.).

At block 1114, the device determines whether the counter incremented at block 1112 has reached a defined maximum count (e.g., beamFailureInstanceMaxCount). If not, the operational flow proceeds back to block 1110 where the MAC layer waits to receive the next instance of a beam failure indication from the PHY layer.

On the other hand, if the counter has reached the defined maximum count at block 1114, the operational flow proceeds to block 1116. At block 1116, the device generates a beam failure recovery request (BFRQ). For example, a UE may generate the BFRQ (e.g., indicating whether all active beams failed or a particular active beam failed) and transmit the BFRQ to the gNB that serves the UE. As another example, a gNB may generate the BFRQ (e.g., indicating whether all active beams for a UE failed or a particular active beam for the UE failed) and transmit the BFRQ to that UE. In some examples, the BFRQ may include an indication of whether the beam failure is due to downlink quality degradation and/or due to self-interference. The operational flow for the PHY layer then proceeds back to block 1110 where the MAC layer waits to receive the next instance of a beam failure indication from the PHY layer.

The MAC layer may also maintain one or more timers (or counters) that control the beam failure detection time. For the full failure indication discussed above, a single timer (or counter) may be used. For the partial failure indication discussed above, multiple timers (or counters) may be used where a given timer may be used for a particular beam. For example, the MAC layer may maintain timer 1 for beam 1, timer 2 for beam 2, and so on.

At block 1118, the device starts (e.g., resets) a given timer. At block 1120, the device may repeatedly (e.g., periodically) check whether the timer has expired. Once the timer expires (e.g., a period of time corresponding to beamFailureDetectionTimer has elapsed since the timer was started), the device resets a corresponding counter that is used at block 1112. For example, a timer for all beams may reset a counter for all beams, a timer for beam 1 may reset a counter for beam 1, a timer for beam 2 may reset a counter for beam 2, and so on. Once the corresponding counter is reset (or counters are reset), the operation flow proceeds back to block 1118. The device may thus generate a BFRQ if a beam or a set of beams fails a defined number of times (e.g., beamFailureInstanceMaxCount) within a defined period of time per time or all times (e.g., beamFailureDetectionTimer).

Figure 12:
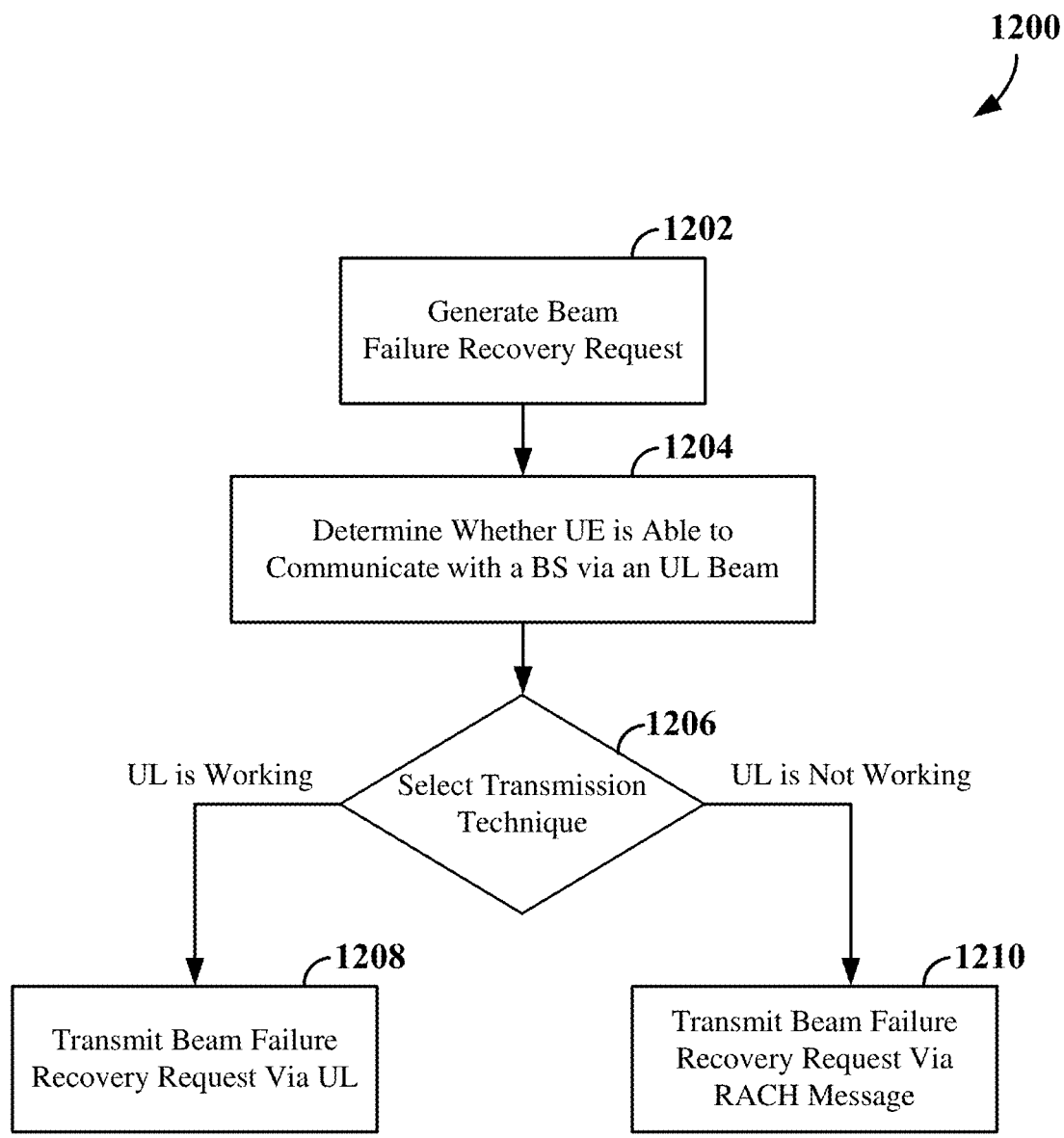
FIG. 12 is a flow chart of example beam failure reporting operations according to some aspects.

FIG. 12 is a flow chart illustrating an example beam failure reporting method 1200 for a UE in accordance with some aspects of the present disclosure. As described below, some or all illustrated features may be omitted in a particular implementation within the scope of the present disclosure, and some illustrated features may not be required for implementation of all examples. In some examples, the method 1200 may be carried out by the UE 1300 of FIG. 13, or by any suitable apparatus or means for carrying out the functions or algorithm described below.

At block 1202, the UE generates a beam failure recovery request (BFRQ). For example, a UE may generate a BFRQ as described above in conjunction with FIG. 11.

At block 1204, the UE determines whether it is able to communicate with a base station via an uplink beam (e.g., the UE determines whether the uplink is currently working). For example, the UE may determine whether information the UE sent to the base station is acknowledged by the base station. For a beam failure due to UE self-interference, the uplink and the downlink may each be fully functional independent of the other beam. That is, the beam failure might only occur when there are transmissions on both beams at the same time. In this case, the beams could still be fully functional otherwise (e.g., when a half-duplex communication mode is used).

At block 1206, the UE selects a transmission technique for transmitting the BFRQ to the base station based on whether the UE is able to communicate with a base station via the uplink beam. For example, if the uplink is working, the UE may transmit the BFRQ to the base station via uplink signaling (e.g., on PUCCH or PUSCH) at block 1208. Conversely, if the uplink is not working, the UE may transmit the BFRQ to the base station via a BFR RACH message at block 1210. As mentioned above, the BFRQ may indicate whether the beam failure at the UE is due to downlink quality degradation and/or UE self-interference.

Figure 13:
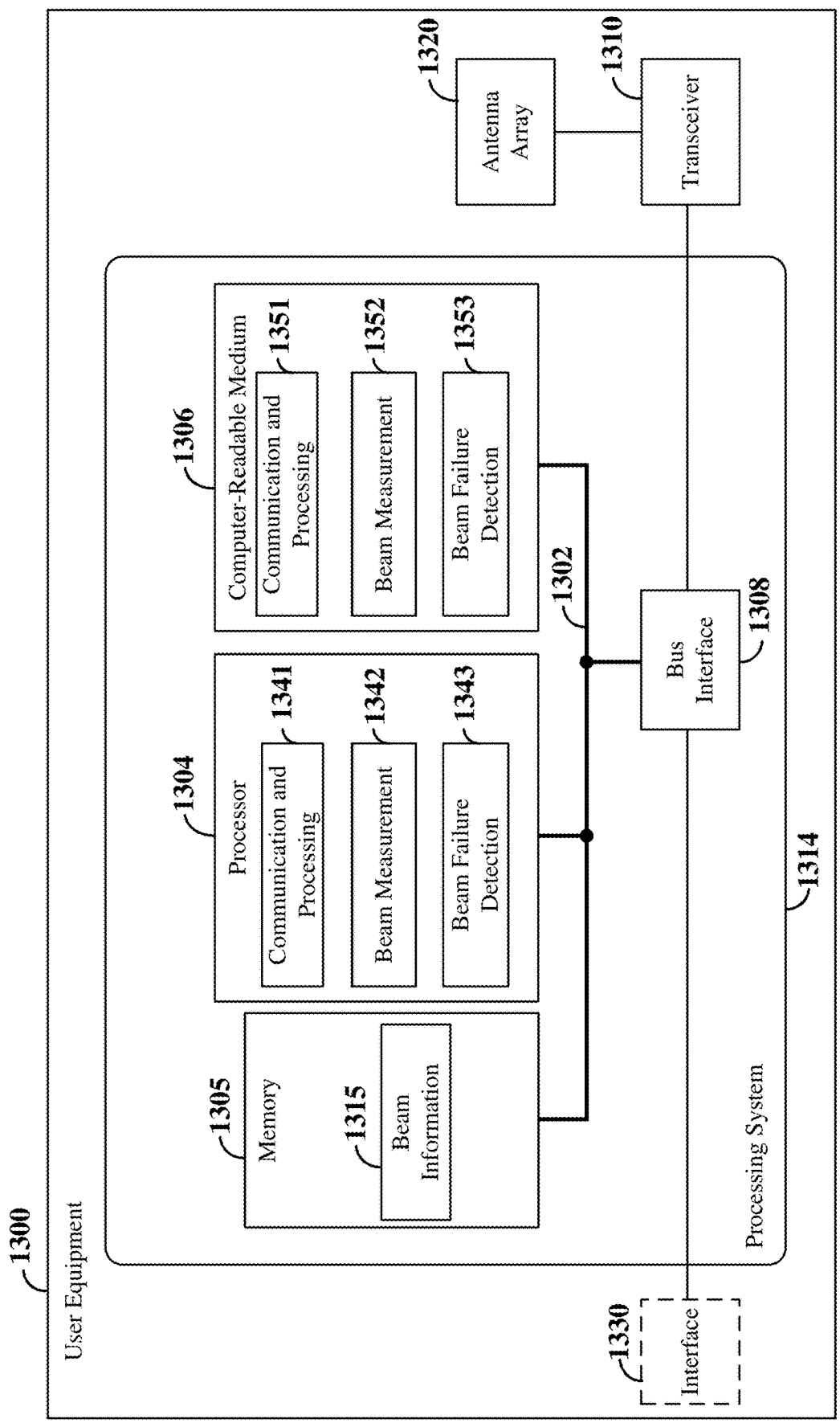
FIG. 13 is a block diagram conceptually illustrating an example of a hardware implementation for a user equipment employing a processing system according to some aspects.

FIG. 13 is a block diagram illustrating an example of a hardware implementation for a user equipment (UE) 1300 employing a processing system 1314. For example, the UE 1300 may be a device configured to wirelessly communicate with base station, as discussed in any one or more of FIGS. 1-12. In some implementations, the UE 1300 may correspond to any of the UEs or scheduled entities shown in any of FIGS. 1, 2, 4, 5, 7A, 7B, 7C, and 9.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

The processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and an antenna array 1320, and an interface between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the UE 1300 or other external apparatuses) over an internal bus or external transmission medium, such as an Ethernet cable. Depending upon the nature of the UE 1300, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store beam information 1315 used by the processor 1304 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14 and 15). In some aspects of the disclosure, the processor 1304, as utilized in the UE 1300, may include circuitry configured for various functions.

The processor 1304 may include communication and processing circuitry 1341. The communication and processing circuitry 1341 may be configured to communicate with a scheduling entity, such as a gNB. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

In some examples, the communication and processing circuitry 1341 may be configured to receive and process downlink beamformed signals at a mmWave frequency or a sub-6 GHz frequency via the transceiver 1310 and an antenna array 1320. For example, the communication and processing circuitry 1341 may be configured to receive a respective reference signal (e.g., SSB or CSI-RS) on each of a plurality of downlink beams from the base station during a downlink beam sweep via at least one first antenna panel of the antenna array 1320. The communication and processing circuitry 1341 may further be configured to transmit a beam measurement report to the base station.

In some examples, the communication and processing circuitry 1341 may further be configured to generate and transmit uplink beamformed signals at a mmWave frequency or a sub-6 GHz frequency via the transceiver 1310 and the antenna array 1320. For example, the communication and processing circuitry 1341 may be configured to transmit a respective reference signal (e.g., SRS or DMRS) on each of a plurality of uplink beams to the base station during an uplink beam sweep via at least one second antenna panel of the antenna array 1320.

The communication and processing circuitry 1341 may further be configured to control the antenna array 1320 and the transceiver 1310 to search for and identify a plurality of downlink transmit beams during a downlink beam sweep. The communication and processing circuitry 1341 may further be configured to obtain a plurality of beam measurements on each of a plurality of downlink receive beams via the antenna array 1320 for each of the identified downlink transmit beams. The communication and processing circuitry 1341 may further be configured to generate a beam measurement report for transmission to the base station using the communication and processing circuitry 1341.

The communication and processing circuitry 1341 may further be configured to identify one or more selected uplink beam(s) based on the beam measurements obtained from the downlink beam reference signals. In some examples, the communication and processing circuitry 1341 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1341 may be configured to generate one or more uplink transmit beams for transmission in an uplink beam sweep. Each uplink transmit beam may carry an uplink reference signal (e.g., an SRS) for measurement by the base station. The communication and processing circuitry 1341 may further be configured to identify the selected uplink transmit beam(s) selected by the base station based on the uplink beam measurements. For example, the communication and processing circuitry 1341 may be configured to receive an indication of the selected uplink transmit beam(s) from the base station.

In still further aspects, it is noted that the antenna array(s) 1330 may be configured by the processor 1304 (and memory 1305 or medium 1306) to implement a first antenna panel and a second antenna panel. Additionally, the processor 1304 (and memory 1305 or medium 1306) may be configured to use the first antenna panel to transmit a first beam (e.g., an UL transmitting beam for FD communication) and the second antenna panel to receive a second beam (e.g., a DL receiving beam for FD communication). The second antenna panel may be used by the processor 1304 to measure self-interference of the UE for FD communication.

In some implementations where the communication involves receiving information, the communication and processing circuitry 1341 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

In some implementations, the communication and processing circuitry 1341 may include functionality for a means for transmitting at least one uplink reference signal to a base station. For example, the communication and processing circuitry 1341 may be configured to transmit an SRS and/or a DMRS on at least one resource allocated by the base station.

The processor 1304 may include beam measurement circuitry 1342 configured to perform beam measurement-related operations as discussed herein (e.g., the PHY layer measurement operations of FIG. 11). The beam measurement circuitry 1342 may be configured to execute beam measurement software 1352 included on the computer-readable medium 1306 to implement one or more functions described herein.

The beam measurement circuitry 1342 may include functionality for a means for receiving and/or measuring at least one reference signal. For example, the beam measurement circuitry 1342 may be configured to measure the RSRP of an RLM-RS (e.g., an SSB, a CSI-RS, or some other reference signal) received on one or more beams transmitted by a gNB (e.g., on a CMR). As another example, the beam measurement circuitry 1342 may be configured to use a first panel to measure an SRS or a DMRS transmitted by the UE via a second panel (e.g., on an IMR).

The beam measurement circuitry 1342 may include functionality for a means for deriving at least one quality parameter. For example, the beam measurement circuitry 1342 may be configured to calculate one or more of SINR, BLER, etc., based on one or more reference signals measured on one or more beams as discussed above.

The processor 1304 may include beam failure detection circuitry 1343 configured to perform beam failure detection-related operations as discussed herein (e.g., the PHY layer and/or MAC layer beam failure detection operations of FIG. 11). The beam failure detection circuitry 1343 may be configured to execute beam failure detection software 1353 included on the computer-readable medium 1306 to implement one or more functions described herein.

The beam failure detection circuitry 1343 may include functionality for a means for comparing a quality parameter to a threshold. For example, the beam failure detection circuitry 1343 may include comparator functionality that compares an RSRP, an SINR, or a BLER parameter with a beam failure detection threshold.

The beam failure detection circuitry 1343 may include functionality for a means for generating a beam failure indication. For example, the beam failure detection circuitry 1343 may be configured to perform the PHY layer beam failure indication operations of FIG. 11 (e.g., to send an instance of a beam failure indication to the MAC layer).

The beam failure detection circuitry 1343 may include functionality for a means for generating and/or transmitting a beam failure recovery request. For example, the beam failure detection circuitry 1343 may be configured to perform the MAC layer beam failure recovery request operations of FIG. 11.

Figure 14:
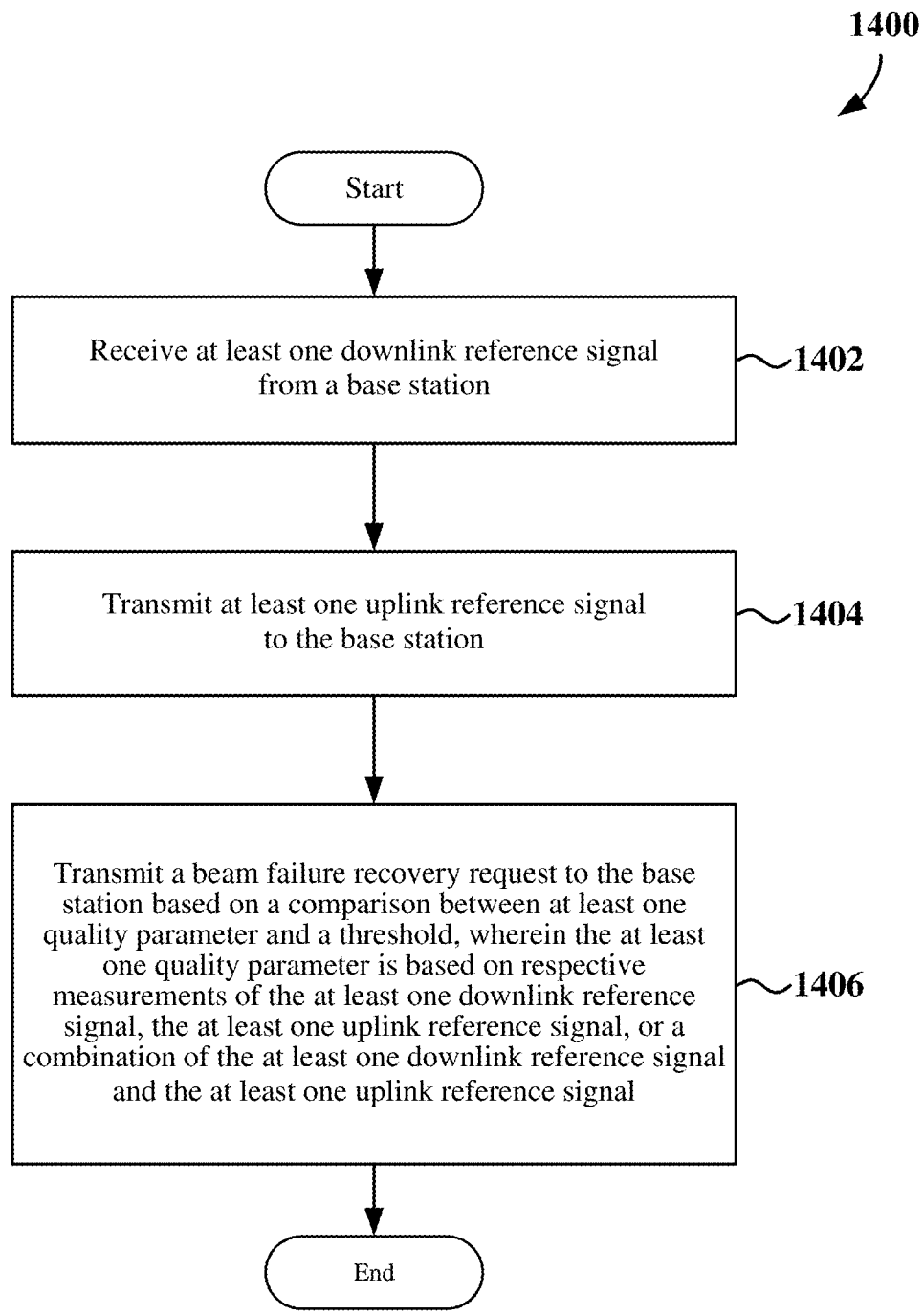
FIG. 14 is a flow chart of an example beam failure recovery process according to some aspects.

FIG. 14 is a flow chart illustrating an example wireless communication method 1400 according to some aspects. As described below, some or all illustrated features may be omitted in a particular implementation within the scope of the present disclosure, and some illustrated features may not be required for implementation of all examples. In some examples, the method 1400 may be carried out by the UE 1300 illustrated in FIG. 13. In some examples, the method 1400 may be carried out by any suitable apparatus or means for carrying out the functions or algorithm described below.

At block 1402, a UE may receive at least one downlink reference signal from a base station. In some examples, the beam measurement circuitry 1342 in cooperation with the communication and processing circuitry 1341 and the transceiver 1310, shown and described in FIG. 13, may provide a means to receive at least one downlink reference signal from a base station.

In some examples, the at least one downlink reference signal may include at least one synchronization signal block (SSB) signal. In some examples, the at least one downlink reference signal may include at least one channel state information reference signal (CSI-RS).

At block 1404, the UE may transmit at least one uplink reference signal to the base station. In some examples, the beam measurement circuitry 1342 in cooperation with the communication and processing circuitry 1341 and the transceiver 1310, shown and described in FIG. 13, may provide a means to transmit at least one uplink reference signal to the base station.

In some examples, the at least one uplink reference signal may include at least one sounding reference signal (SRS). In some examples, the at least one uplink reference signal may include at least one demodulation reference signal (DMRS).

At block 1406, the UE may transmit a beam failure recovery request to the base station based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal. In some examples, the beam failure detection circuitry 1343 in cooperation with the communication and processing circuitry 1341 and the transceiver 1310, shown and described in FIG. 13, may provide a means to transmit a beam failure recovery request to the base station based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal.

In some examples, the at least one quality parameter may include a signal-to-interference-plus-noise ratio (SINR) parameter. In some examples, the at least one quality parameter may include a block error rate (BLER) based on a signal-to-interference-plus-noise ratio (SINR).

In some examples, the UE may derive the at least one quality parameter from the at least one downlink reference signal, the at least one uplink reference signal, or the at least one downlink reference signal and the at least one uplink reference signal. In some examples, to derive the at least one quality parameter, the UE may combine SSB signal measurement information and SRS measurement information for the FD communication, combine CSI-RS measurement information and SRS measurement information for the FD communication, combine SSB signal measurement information and DMRS measurement information for the FD communication, or combine CSI-RS measurement information and DMRS measurement information for the FD communication.

In some examples, the UE may derive the at least one quality parameter only from the at least one downlink reference signal. In some examples, the at least one beam failure indication is for a beam failure due to a downlink quality degradation.

In some examples, the UE may derive the at least one quality parameter from both the at least one downlink reference signal and the at least one uplink reference signal. In some examples, the at least one beam failure indication is for a beam failure due to self-interference by the user equipment.

In some examples, the UE may generate at least one beam failure indication for a medium access control (MAC) layer based on the comparison between the at least one quality parameter and the threshold. In some examples, the at least one beam failure indication may include a MAC layer beam failure instance indication. In some examples, to generate the at least one beam failure indication, the UE may send a respective beam failure indication to the MAC layer each time a derived quality parameter of the at least one quality parameter is less than or equal to the threshold.

In some examples, the UE may generate the beam failure recovery request at the MAC layer based on the at least one beam failure indication. In some examples, to generate the beam failure recovery request, the UE may receive the at least one beam failure indication from a physical layer during a defined detection time, increment a counter upon receipt of each beam failure indication of the at least one beam failure indication, and generate the beam failure recovery request when the counter reaches a maximum count threshold during the defined detection time. In some examples, the maximum count threshold may include a beam failure instance maximum count for downlink quality measurements and uplink self-interference measurements. In some examples, the defined detection time may include a beam failure detection time for downlink quality measurements and uplink self-interference measurements.

In some examples, the UE may measure interference from a first beam to a second beam on at least one interference measurement resource (IMR). In this case, the first beam may be an uplink transmitting beam and the second beam may be a downlink receiving beam for the FD communication. In some examples, the measuring interference from the first beam to the second beam on the at least one IMR may involve the UE measuring self-interference by the user equipment for the FD communication. In some examples, the measuring the at least one downlink reference signal may involve the UE measuring a downlink signal of the second beam on at least one channel measurement resource (CMR).

In some examples, the UE may receive a radio link monitoring configuration including a first category of radio link monitoring reference signals (RLM-RSs) of the at least one CMR and a second category of RLM-RSs of the at least one IMR. In some examples, the first category may include at least one synchronization signal block (SSB) index or at least one channel state information reference signal (CSI-RS) resource identifier. In some examples, the second category may include at least one sounding reference signal (SRS) resource identifier or at least one demodulation reference signal (DMRS) resource identifier.

In some examples, the at least one quality parameter may include a first quality parameter for a first active downlink (DL) and uplink (UL) beam pair and a second quality parameter for a second active DL and UL beam pair for the FD communication. In some examples, to generate the at least one beam failure indication for the MAC layer, the UE may determine that the first quality parameter for the first DL and UL beam pair is less than or equal to the threshold and that the second quality parameter for the second DL and UL beam pair is less than or equal to the threshold. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, the at least one quality parameter may include a first quality parameter for a first downlink (DL) and uplink (UL) beam pair and a second quality parameter for a second DL and UL beam pair. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, to generate the at least one beam failure indication for the MAC layer, the UE may determine that the first quality parameter for the first DL and UL beam pair is less than or equal to the threshold. In some examples, the UE may determine that the second quality parameter for the second DL and UL beam pair is less than or equal to the threshold.

In some examples, to generate the at least one beam failure indication for the MAC layer, the UE may use a first counter and a first detection timer to monitor the first DL and UL beam pair at the MAC layer, or use a second counter and a second detection timer to monitor the second DL and UL beam pair at the MAC layer.

Figure 15:
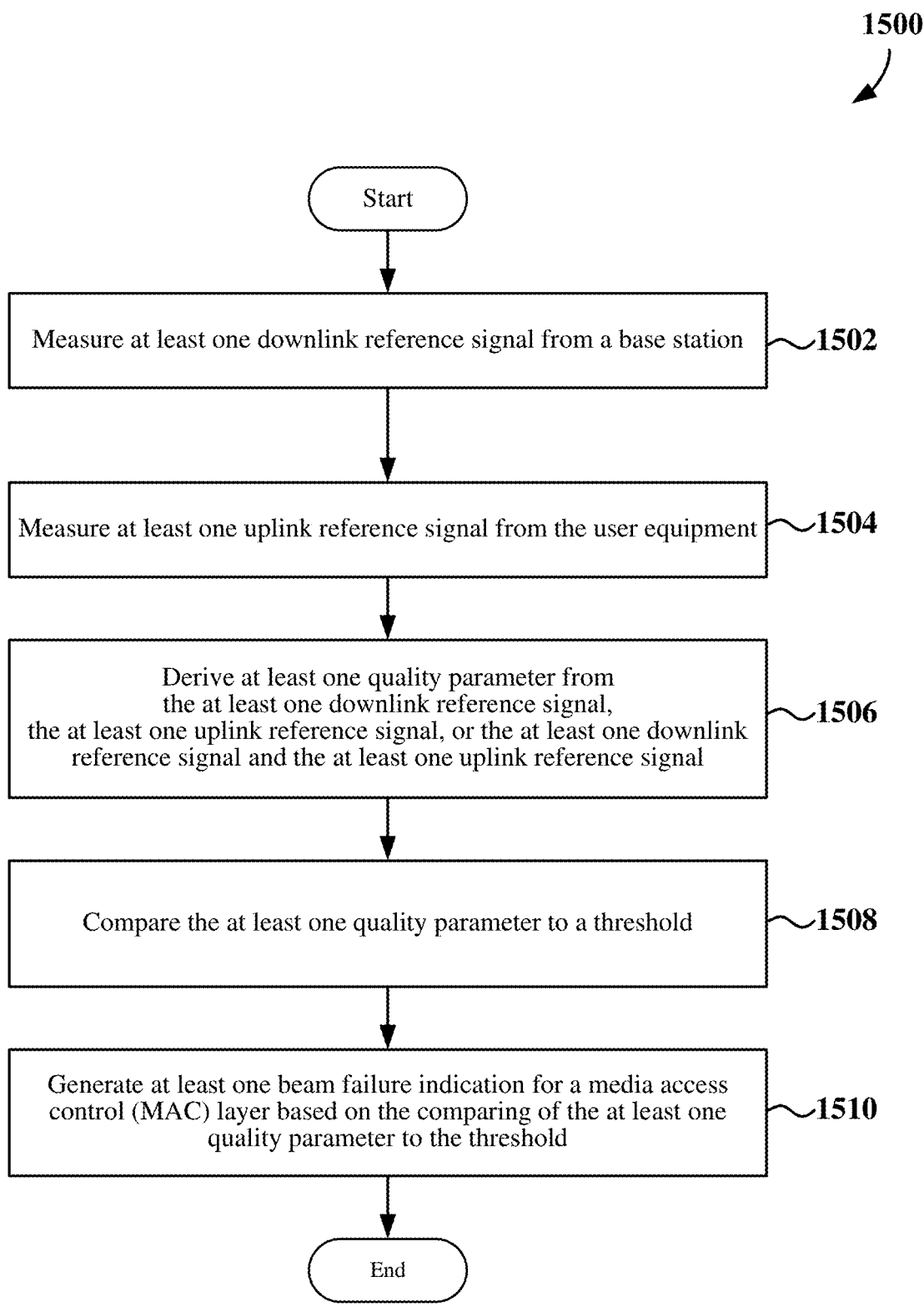
FIG. 15 is a flow chart of an example process for beam failure detection according to some aspects.

FIG. 15 is a flow chart illustrating an example wireless communication method 1500 according to some aspects. As described below, some or all illustrated features may be omitted in a particular implementation within the scope of the present disclosure, and some illustrated features may not be required for implementation of all examples. In some examples, the method 1500 may be carried out by the UE 1300 illustrated in FIG. 13. In some examples, the method 1500 may be carried out by any suitable apparatus or means for carrying out the functions or algorithm described below.

At block 1502, a UE may measure at least one downlink reference signal from a base station. In some examples, the beam measurement circuitry 1342 in cooperation with the communication and processing circuitry 1341 and the transceiver 1310, shown and described in FIG. 13, may provide a means to measure at least one downlink reference signal from a base station.

In some examples, the at least one downlink reference signal may include at least one synchronization signal block (SSB) signal. In some examples, the at least one downlink reference signal may include at least one channel state information reference signal (CSI-RS).

At block 1504, the UE may measure at least one uplink reference signal from the UE. In some examples, the beam measurement circuitry 1342 in cooperation with the communication and processing circuitry 1341 and the transceiver 1310, shown and described in FIG. 13, may provide a means to measure at least one uplink reference signal from the UE.

In some examples, the at least one uplink reference signal may include at least one sounding reference signal (SRS). In some examples, the at least one uplink reference signal may include at least one demodulation reference signal (DMRS).

In some examples, the UE may measure interference from a first beam to a second beam on at least one interference measurement resource (IMR). In this case, the first beam may be an uplink transmitting beam and the second beam may be a downlink receiving beam for the FD communication. In some examples, the measuring interference from the first beam to the second beam on the at least one IMR may involve the UE measuring self-interference by the user equipment for the FD communication. In some examples, the measuring the at least one downlink reference signal may involve the UE measuring a downlink signal of the second beam on at least one channel measurement resource (CMR).

In some examples, the UE may receive a radio link monitoring configuration including a first category of radio link monitoring reference signals (RLM-RSs) of the at least one CMR and a second category of RLM-RSs of the at least one IMR. In some examples, the first category may include at least one synchronization signal block (SSB) index or at least one channel state information reference signal (CSI-RS) resource identifier. In some examples, the second category may include at least one sounding reference signal (SRS) resource identifier or at least one demodulation reference signal (DMRS) resource identifier.

At block 1506, the UE may derive at least one quality parameter from the at least one downlink reference signal, the at least one uplink reference signal, or the at least one downlink reference signal and the at least one uplink reference signal. In some examples, the beam measurement circuitry 1342, shown and described in FIG. 13, may provide a means to derive at least one quality parameter from the at least one downlink reference signal, the at least one uplink reference signal, or the at least one downlink reference signal and the at least one uplink reference signal.

In some examples, the at least one quality parameter may include a signal-to-interference-plus-noise ratio (SINR) parameter. In some examples, the at least one quality parameter may include a block error rate (BLER) based on a signal-to-interference-plus-noise ratio (SINR).

In some examples, to derive the at least one quality parameter, the UE may combine SSB signal measurement information and SRS measurement information for the FD communication, combine CSI-RS measurement information and SRS measurement information for the FD communication, combine SSB signal measurement information and DMRS measurement information for the FD communication, or combine CSI-RS measurement information and DMRS measurement information for the FD communication.

At block 1508, the UE may compare the at least one quality parameter to a threshold. In some examples, the beam failure detection circuitry 1343, shown and described in FIG. 13, may provide a means to compare the at least one quality parameter to a threshold.

At block 1510, the UE may generate at least one beam failure indication for a medium access control (MAC) layer based on the comparing of the at least one quality parameter to the threshold. In some examples, the beam failure detection circuitry 1343 in cooperation with the communication and processing circuitry 1341 and the transceiver 1310, shown and described in FIG. 13, may provide a means to generate at least one beam failure indication for a medium access control (MAC) layer based on the comparing of the at least one quality parameter to the threshold. In some examples, the at least one beam failure indication may include a medium access control (MAC) layer beam failure instance indication.

In some examples, to generate the at least one beam failure indication for the MAC layer, the UE may send a beam failure indication to the MAC layer each time a derived quality parameter of the at least one quality parameter is less than or equal to the threshold.

In some examples, the UE may generate a beam failure recovery request at the MAC layer based on the at least one beam failure indication. In some examples, to generate the beam failure recovery request, the UE may receive the at least one beam failure indication from a physical layer during a defined detection time, increment a counter upon receipt of each of beam failure indication of the at least one beam failure indication, and generate the beam failure recovery request for the base station when the counter reaches a maximum count threshold during the defined detection time. In some examples, the maximum count threshold may include a beam failure instance maximum count for downlink quality measurements and uplink self-interference measurements. In some examples, the defined detection time may include a beam failure detection time for downlink quality measurements and uplink self-interference measurements.

In some examples, the at least one quality parameter may include a first quality parameter for a first active downlink (DL) and uplink (UL) beam pair and a second quality parameter for a second active DL and UL beam pair for the FD communication. In some examples, to generate the at least one beam failure indication for the MAC layer, the UE may determine that the first quality parameter for the first DL and UL beam pair is less than or equal to the threshold and that the second quality parameter for the second DL and UL beam pair is less than or equal to the threshold. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, the at least one quality parameter may include a first quality parameter for a first downlink (DL) and uplink (UL) beam pair and a second quality parameter for a second DL and UL beam pair. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, to generate the at least one beam failure indication for the MAC layer, the UE may determine that the first quality parameter for the first DL and UL beam pair is less than or equal to the threshold. In some examples, the UE may determine that the second quality parameter for the second DL and UL beam pair is less than or equal to the threshold.

In some examples, to generate the at least one beam failure indication for the MAC layer, the UE may use a first counter and a first detection timer to monitor the first DL and UL beam pair at the MAC layer, or use a second counter and a second detection timer to monitor the second DL and UL beam pair at the MAC layer.

In some examples, the UE may derive the at least one quality parameter only from the at least one downlink reference signal. In some examples, the at least one beam failure indication is for a beam failure due to a downlink quality degradation.

In some examples, the UE may derive the at least one quality parameter from both the at least one downlink reference signal and the at least one uplink reference signal. In some examples, the at least one beam failure indication is for a beam failure due to self-interference by the user equipment.

In one configuration, the UE 1300 includes means for receiving at least one downlink reference signal from a base station, means for transmitting at least one uplink reference signal to the base station, and means for transmitting a beam failure recovery request to the base station based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal. In one configuration, the UE 1300 includes means for measuring at least one downlink reference signal from a base station, means for measuring at least one uplink reference signal from the user equipment, means for deriving at least one quality parameter from the at least one downlink reference signal, the at least one uplink reference signal, or the at least one downlink reference signal and the at least one uplink reference signal, means for comparing the at least one quality parameter to a threshold, and means for generating at least one beam failure indication for a medium access control (MAC) layer based on the comparing of the at least one quality parameter to the threshold. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 4, 5, 7A, 7B, 7C, 9, and 13, and utilizing, for example, the methods and/or algorithms described herein in relation to FIG. 15.

Figure 16:
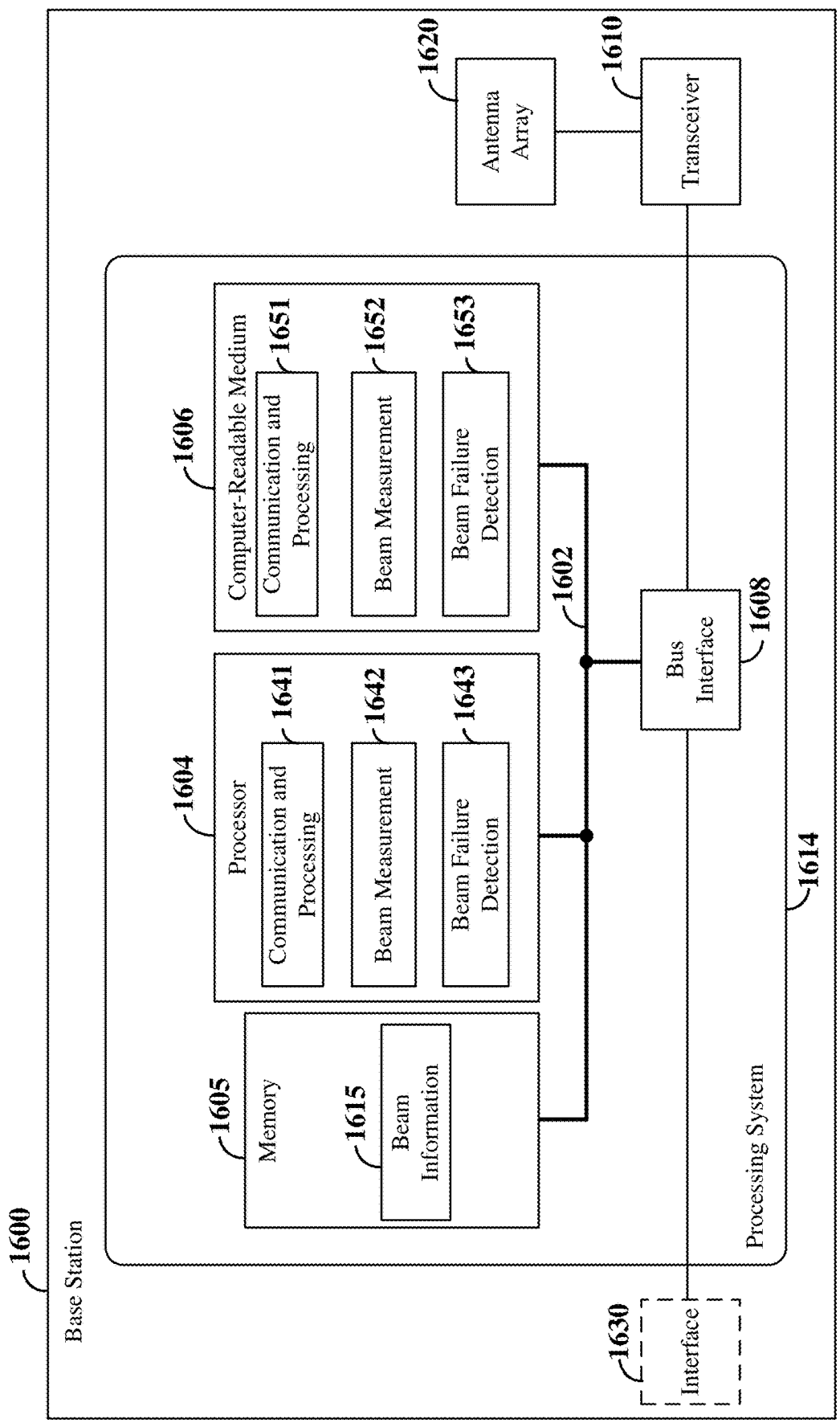
FIG. 16 is a block diagram conceptually illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in any of FIGS. 1, 2, 4, 5, 7A, 7B, 7C, and 9.

In accordance with various aspects of the disclosure, an element, or any portion of an element, or any combination of elements may be implemented with the processing system 1614. The processing system may include one or more processors 1604. The processing system 1614 may be substantially the same as the processing system 1314 illustrated in FIG. 13, including a bus interface 1608, a bus 1602, memory 1605, a processor 1604, a computer-readable medium 1606, a transceiver 1610, and an antenna array 1620. The memory 1605 may store beam information 1615 used by the processor 1604 for communication operations as discussed herein. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-12 and as described below in conjunction with FIGS. 17 and 18). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs. The processor 1604 may be configured to schedule resources for the transmission of downlink signals and/or resources for the transmission of uplink signals.

The processor 1604 may be configured to schedule resources for the transmission of downlink reference signals (e.g., SSBs or CSI-RSs) on a plurality of downlink beams for a downlink beam sweep in accordance with a selected number of downlink reference signal resources. In some examples, the scheduled resources may be CMRs.

The processor 1604 may be configured to schedule resources for the transmission of an uplink signal. In some examples, the resources may be associated with one or more uplink transmit beams and one or more corresponding receive beams applied to the uplink signal (e.g., based on the uplink BPLs). The processor 1604 may be configured to schedule resources for the uplink transmission of uplink reference signals (e.g., SRSs) on a plurality of uplink beams for an uplink beam sweep. In some examples, the scheduled resources may be IMRs.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some examples, the communication and processing circuitry 1641 may be configured to receive and process uplink beamformed signals at a mmWave frequency or a sub-6 GHz frequency via the transceiver 1610 and an antenna array 1620. For example, the communication and processing circuitry 1641 may be configured to receive a respective reference signal (e.g., SRS or DMRS) on each of a plurality of uplink beams from the UE during an uplink beam sweep.

In some examples, the communication and processing circuitry 1641 may further be configured to generate and transmit downlink beamformed signals at a mmWave frequency or a sub-6 GHz frequency via the transceiver 1610 and the antenna array 1620. For example, the communication and processing circuitry 1641 may be configured to transmit a respective downlink reference signal (e.g., SSB or CSI-RS) on each of a plurality of downlink beams to the UE during a downlink beam sweep via at least one first antenna panel of the antenna array 1620. The communication and processing circuitry 1641 may further be configured to receive a beam measurement report from the UE.

The communication and processing circuitry 1641 may further be configured to control the antenna array 1620 and transceiver 1610 to generate a plurality of downlink transmit beams during a downlink beam sweep. The communication and processing circuitry 1641 may further be configured to receive a beam measurement report from the UE. The communication and processing circuitry 1641 may further be configured to identify one or more selected uplink beam(s) based on the beam measurements. In some examples, the communication and processing circuitry 1641 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1641 may be configured to receive one or more uplink transmit beams in an uplink beam sweep. Each uplink transmit beam may carry an uplink reference signal (e.g., an SRS) for measurement by the communication and processing circuitry 1641. The communication and processing circuitry 1641 may further be configured to obtain a plurality of beam measurements on each of a plurality of uplink receive beams of the antenna array 1620 for each of the uplink transmit beams. The communication and processing circuitry 1641 may further be configured to select the selected uplink transmit beam(s) and corresponding uplink receive beams forming respective uplink BPLs based on the uplink beam measurements.

In still further aspects, it is noted that the antenna array(s) 1630 may be configured by the processor 1604 (and memory 1605 or medium 1606) to implement a first antenna panel and a second antenna panel. Additionally, the processor 1604 (and memory 1605 or medium 1606) may be configured to use the first antenna panel to transmit a first beam (e.g., a DL transmitting beam for FD communication) and the second antenna panel to receive a second beam (e.g., an UL receiving beam for FD communication). The second antenna panel may be used by the processor 1604 to measure self-interference of the BS 1600 for FD communication.

In some implementations wherein the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

In some implementations, the communication and processing circuitry 1641 may include functionality for a means for transmitting at least one downlink reference signal. For example, the communication and processing circuitry 1641 may be configured to broadcast an SSB and/or a CSI-RS on at least one designated resource.

The processor 1604 may include beam measurement circuitry 1642 configured to perform beam measurement-related operations as discussed herein (e.g., the PHY layer measurement operations of FIG. 11). The beam measurement circuitry 1642 may be configured to execute beam measurement software 1652 included on the computer-readable medium 1606 to implement one or more functions described herein.

The beam measurement circuitry 1642 may include functionality for a means for receiving and/or measuring at least one reference signal. For example, the beam measurement circuitry 1642 may be configured to measure the RSRP of a reference signal (e.g., an SRS, a DMRS, or some other reference signal) received on one or more beams transmitted by a UE (e.g., on an IMR). As another example, the beam measurement circuitry 1642 may be configured to use a first panel to measure an SSB or a CSI-RS transmitted by the base station via a second panel (e.g., on a CMR).

The beam measurement circuitry 1642 may include functionality for a means for deriving at least one quality parameter. For example, the beam measurement circuitry 1642 may be configured to calculate one or more of an SINR, a BLER, etc., based on one or more reference signals measured on one or more beams as discussed above.

The processor 1604 may include beam failure detection circuitry 1643 configured to perform beam failure detection-related operations as discussed herein (e.g., the PHY layer and/or MAC layer beam failure detection operations of FIG. 11). The beam failure detection circuitry 1643 may be configured to execute beam failure detection software 1653 included on the computer-readable medium 1606 to implement one or more functions described herein.

The beam failure detection circuitry 1643 may include functionality for a means for comparing a quality parameter to a threshold. For example, the beam failure detection circuitry 1643 may include comparator functionality that compares an RSRP, an SINR, or a BLER parameter with a beam failure detection threshold.

The beam failure detection circuitry 1643 may include functionality for a means for generating a beam failure indication. For example, the beam failure detection circuitry 1643 may be configured to perform the PHY layer beam failure indication operations of FIG. 11 (e.g., to send an instance of a beam failure indication to the MAC layer).

The beam failure detection circuitry 1643 may include functionality for a means for generating and/or transmitting a beam failure recovery message (e.g., a beam failure recovery request). For example, the beam failure detection circuitry 1643 may be configured to perform the MAC layer beam failure recovery request operations of FIG. 11.

Figure 17:
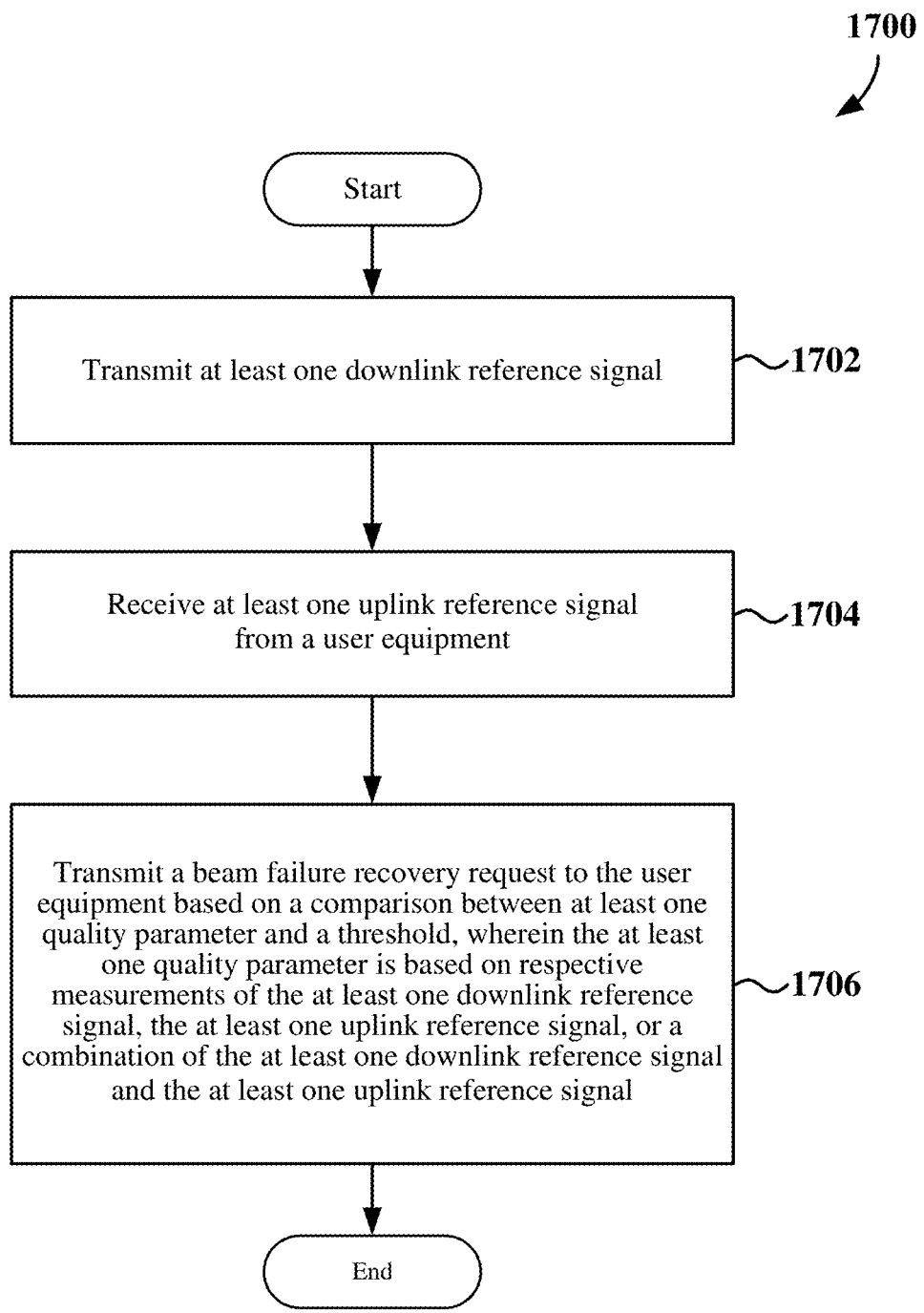
FIG. 17 is a flow chart of another example beam failure recovery process according to some aspects.

FIG. 17 is a flow chart illustrating an example wireless communication method 1700 according to some aspects. As described below, some or all illustrated features may be omitted in a particular implementation within the scope of the present disclosure, and some illustrated features may not be required for implementation of all examples. In some examples, the method 1700 may be carried out by the BS 1600 illustrated in FIG. 16. In some examples, the method 1700 may be carried out by any suitable apparatus or means for carrying out the functions or algorithm described below.

At block 1702, a base station may transmit at least one downlink reference signal. In some examples, the beam measurement circuitry 1642 in cooperation with the communication and processing circuitry 1641 and the transceiver 1610, shown and described in FIG. 16, may provide a means to transmit at least one downlink reference signal.

In some examples, the at least one downlink reference signal may include at least one synchronization signal block (SSB) signal. In some examples, the at least one downlink reference signal may include at least one channel state information reference signal (CSI-RS).

At block 1704, the base station may receive at least one uplink reference signal from a user equipment. In some examples, the beam measurement circuitry 1642 in cooperation with the communication and processing circuitry 1641 and the transceiver 1610, shown and described in FIG. 16, may provide a means to receive at least one uplink reference signal from a user equipment.

In some examples, the at least one uplink reference signal may include at least one sounding reference signal (SRS). In some examples, the at least one uplink reference signal may include at least one demodulation reference signal (DMRS).

At block 1706, the base station may transmit a beam failure recovery message to the user equipment based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal. In some examples, the beam failure detection circuitry 1643 in cooperation with the communication and processing circuitry 1641 and the transceiver 1610, shown and described in FIG. 16, may provide a means to transmit a beam failure recovery message to the user equipment based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal.

In some examples, the at least one quality parameter may include a signal-to-interference-plus-noise ratio (SINR) parameter. In some examples, the at least one quality parameter may include a block error rate (BLER) based on a signal-to-interference-plus-noise ratio (SINR).

In some examples, the base station may derive the at least one quality parameter from the at least one downlink reference signal, the at least one uplink reference signal, or the at least one downlink reference signal and the at least one uplink reference signal. In some examples, to derive the at least one quality parameter, the base station may combine SSB signal measurement information and SRS measurement information for the FD communication, combine CSI-RS measurement information and SRS measurement information for the FD communication, combine SSB signal measurement information and DMRS measurement information for the FD communication, or combine CSI-RS measurement information and DMRS measurement information for the FD communication.

In some examples, the base station may derive the at least one quality parameter only from the at least one uplink reference signal. In some examples, the at least one beam failure indication is for a beam failure due to a downlink quality degradation.

In some examples, the base station may derive the at least one quality parameter from both the at least one downlink reference signal and the at least one uplink reference signal. In some examples, the at least one beam failure indication is for a beam failure due to self-interference by the user equipment.

In some examples, the base station may generate at least one beam failure indication for a medium access control (MAC) layer based on the comparison between the at least one quality parameter and the threshold. In some examples, the at least one beam failure indication may include a MAC layer beam failure instance indication. In some examples, to generate the at least one beam failure indication, the base station may send a respective beam failure indication to the MAC layer each time a derived quality parameter of the at least one quality parameter is less than or equal to the threshold.

In some examples, the base station may generate the beam failure recovery message at the MAC layer based on the at least one beam failure indication. In some examples, to generate the beam failure recovery request, the base station may receive the at least one beam failure indication from a physical layer during a defined detection time, increment a counter upon receipt of each beam failure indication of the at least one beam failure indication, and generate the beam failure recovery request when the counter reaches a maximum count threshold during the defined detection time. In some examples, the maximum count threshold may include a beam failure instance maximum count for downlink quality measurements and uplink self-interference measurements. In some examples, the defined detection time may include a beam failure detection time for downlink quality measurements and uplink self-interference measurements.

In some examples, the base station may measure interference from a first beam to a second beam on at least one channel measurement resource (CMR). In this case, the first beam may be an uplink transmitting beam and the second beam may be a downlink receiving beam for the FD communication. In some examples, the measuring interference from the first beam to the second beam may involve the base station measuring self-interference by the base station for the 1-1) communication. In some examples, the measuring the at least one downlink reference signal may involve the base station measuring an uplink signal of the second beam on at least one interference measurement resource (IMR).

In some examples, the base station may transmit to the user equipment a radio link monitoring configuration including a first category of radio link monitoring reference signals (RLM-RSs) of the at least one CMR and a second category of RLM-RSs of the at least one IMR. In some examples, the first category may include at least one synchronization signal block (SSB) index or at least one channel state information reference signal (CSI-RS) resource identifier. In some examples, the second category may include at least one sounding reference signal (SRS) resource identifier or at least one demodulation reference signal (DMRS) resource identifier.

In some examples, the at least one quality parameter may include a first quality parameter for a first active downlink (DL) and uplink (UL) beam pair and a second quality parameter for a second active DL and UL beam pair for the FD communication. In some examples, to generate the at least one beam failure indication for the MAC layer, the base station may determine that the first quality parameter for the first DL and UL beam pair is less than or equal to the threshold and that the second quality parameter for the second DL and UL beam pair is less than or equal to the threshold. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, the at least one quality parameter may include a first quality parameter for a first downlink (DL) and uplink (UL) beam pair and a second quality parameter for a second DL and UL beam pair. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, to generate the at least one beam failure indication for the MAC layer, the base station may determine that the first quality parameter for the first DL and UL beam pair is less than or equal to the threshold. In some examples, the base station may determine that the second quality parameter for the second DL and UL beam pair is less than or equal to the threshold.

In some examples, to generate the at least one beam failure indication for the MAC layer, the base station may use a first counter and a first detection timer to monitor the first DL and UL beam pair at the MAC layer, or use a second counter and a second detection timer to monitor the second DL and UL beam pair at the MAC layer.

Figure 18:
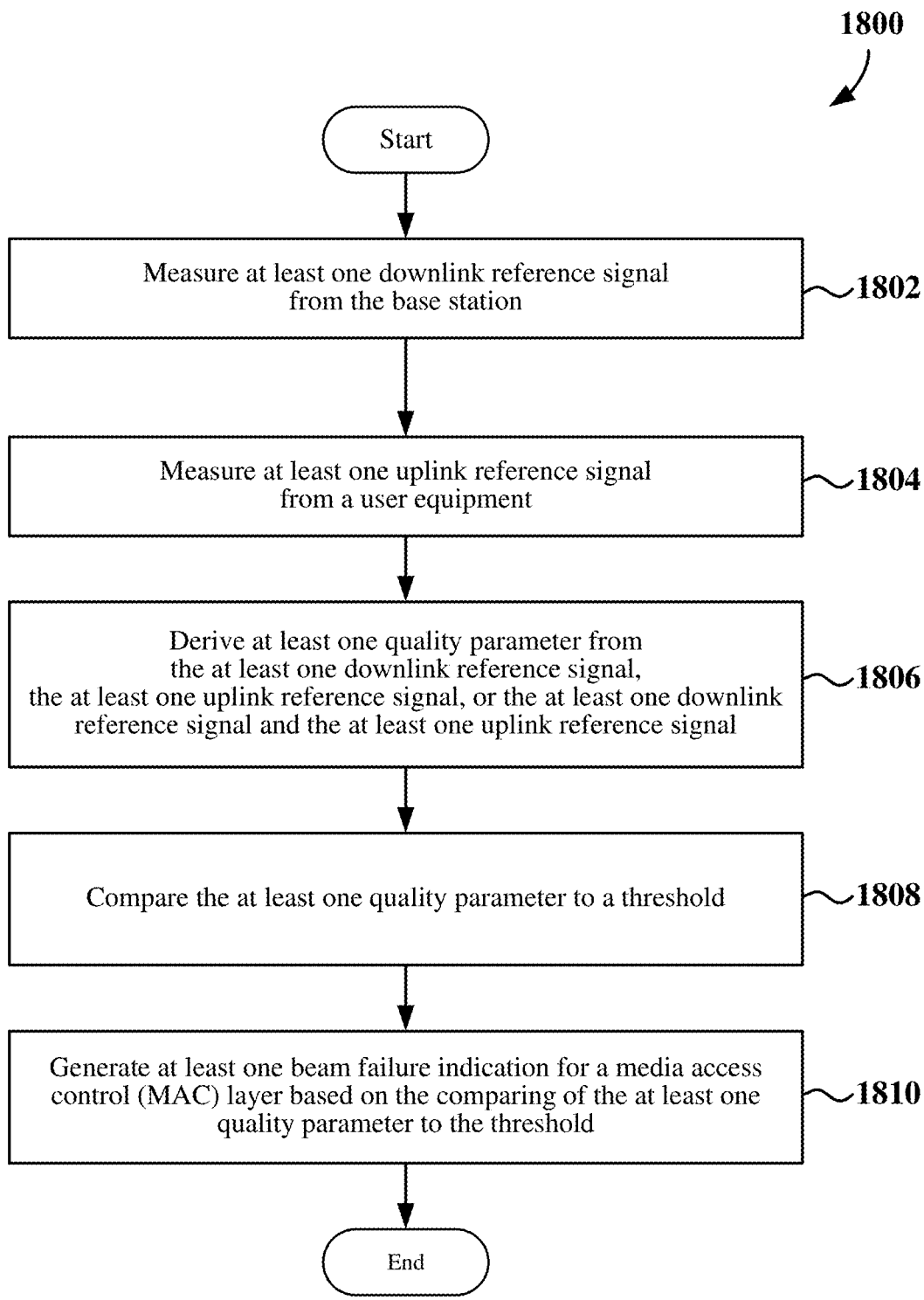
FIG. 18 is a flow chart of another example process for beam failure detection according to some aspects.

FIG. 18 is a flow chart illustrating an example wireless communication method 1800 according to some aspects. As described below, some or all illustrated features may be omitted in a particular implementation within the scope of the present disclosure, and some illustrated features may not be required for implementation of all examples. In some examples, the method 1800 may be carried out by the BS 1600 illustrated in FIG. 16. In some examples, the method 1800 may be carried out by any suitable apparatus or means for carrying out the functions or algorithm described below.

At block 1802, a base station may measure at least one downlink reference signal from the base station. In some examples, the beam measurement circuitry 1642 in cooperation with the communication and processing circuitry 1641 and the transceiver 1610, shown and described in FIG. 16, may provide a means to measure at least one downlink reference signal from the base station.

In some examples, the at least one downlink reference signal may include at least one synchronization signal block (SSB) signal. In some examples, the at least one downlink reference signal may include at least one channel state information reference signal (CSI-RS).

At block 1804, the base station may measure at least one uplink reference signal from a user equipment. In some examples, the beam measurement circuitry 1642 in cooperation with the communication and processing circuitry 1641 and the transceiver 1610, shown and described in FIG. 16, may provide a means to measure at least one uplink reference signal from a user equipment.

In some examples, the at least one uplink reference signal may include at least one sounding reference signal (SRS). In some examples, the at least one uplink reference signal may include at least one demodulation reference signal (DMRS).

In some examples, the base station may measure interference from a first beam to a second beam on at least one interference measurement resource (IMR). In this case, the first beam may be a downlink transmitting beam and the second beam may be an uplink receiving beam for the FD communication. In some examples, to measure the interference from the first beam to the second beam on the at least one IMR, the base station may measure self-interference by the base station for the FD communication. In some examples, to measure the at least one downlink reference signal, the base station may measure a downlink signal of the second beam on at least one channel measurement resource (CMR).

In some examples, the base station may transmit a radio link monitoring configuration including a first category of radio link monitoring reference signals (RLM-RSs) of the at least one CMR and a second category of RLM-RSs of the at least one IMR. In some examples, the first category may include at least one synchronization signal block (SSB) index or at least one channel state information reference signal (CSI-RS) resource identifier. In some examples, the second category may include at least one sounding reference signal (SRS) resource identifier or at least one demodulation reference signal (DMRS) resource identifier.

At block 1806, the base station may derive at least one quality parameter from the at least one downlink reference signal, the at least one uplink reference signal, or the at least one downlink reference signal and the at least one uplink reference signal. In some examples, the beam measurement circuitry 1642, shown and described in FIG. 16, may provide a means to derive at least one quality parameter from the at least one downlink reference signal, the at least one uplink reference signal, or the at least one downlink reference signal and the at least one uplink reference signal.

In some examples, the at least one quality parameter may include a signal-to-interference-plus-noise ratio (SINR) parameter. In some examples, the at least one quality parameter may include a block error rate (BLER) based on a signal-to-interference-plus-noise ratio (SINR).

In some examples, to derive the at least one quality parameter, the base station may combine SSB signal measurement information and SRS measurement information for the FD communication, combine CSI-RS measurement information and SRS measurement information for the FD communication, combine SSB signal measurement information and DMRS measurement information for the FD communication, or combine CSI-RS measurement information and DMRS measurement information for the FD communication.

At block 1808, the base station may compare the at least one quality parameter to a threshold. In some examples, the beam failure detection circuitry 1643, shown and described in FIG. 16, may provide a means to compare the at least one quality parameter to a threshold.

At block 1810, the base station may generate at least one beam failure indication for a medium access control (MAC) layer based on the comparing of the at least one quality parameter to the threshold. In some examples, the beam failure detection circuitry 1643 in cooperation with the communication and processing circuitry 1641 and the transceiver 1610, shown and described in FIG. 16, may provide a means to generate at least one beam failure indication for a medium access control (MAC) layer based on the comparing of the at least one quality parameter to the threshold. In some examples, the at least one beam failure indication may include a medium access control (MAC) layer beam failure instance indication.

In some examples, to generate the at least one beam failure indication for the MAC layer, the base station may send a beam failure indication to the MAC layer each time a derived quality parameter of the at least one quality parameter is less than or equal to the threshold.

In some examples, the base station may generate a beam failure recovery request at the MAC layer based on the at least one beam failure indication. In some examples, to generate the beam failure recovery request, the base station may receive the at least one beam failure indication from a physical layer during a defined detection time, increment a counter upon receipt of each of beam failure indication of the at least one beam failure indication, and generate the beam failure recovery request for the base station when the counter reaches a maximum count threshold during the defined detection time. In some examples, the maximum count threshold may include a beam failure instance maximum count for downlink quality measurements and uplink self-interference measurements. In some examples, the defined detection time may include a beam failure detection time for downlink quality measurements and uplink self-interference measurements.

In some examples, the at least one quality parameter may include a first quality parameter for a first active downlink (DL) and uplink (UL) beam pair and a second quality parameter for a second active DL and UL beam pair for the FD communication. In some examples, to generate the at least one beam failure indication for the MAC layer, the base station may determine that the first quality parameter for the first DL and UL beam pair is less than or equal to the threshold and that the second quality parameter for the second DL and UL beam pair is less than or equal to the threshold. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, the at least one quality parameter may include a first quality parameter for a first downlink (DL) and uplink (UL) beam pair and a second quality parameter for a second DL and UL beam pair. In some examples, the first quality parameter for the first DL and UL beam pair is equal to the second quality parameter for the second DL and UL beam pair. In some examples, the first quality parameter for the first DL and UL beam pair is different from the second quality parameter for the second DL and UL beam pair.

In some examples, to generate the at least one beam failure indication for the MAC layer, the base station may determine that the first quality parameter for the first DL and UL beam pair is less than or equal to the threshold or determine that the second quality parameter for the second DL and UL beam pair is less than or equal to the threshold.

In some examples, to generate the at least one beam failure indication, the base station may use a first counter and a first detection timer to monitor the first DL and UL beam pair at the MAC layer, or use a second counter and a second detection timer to monitor the second DL and UL beam pair at the MAC layer.

In some examples, the base station may derive the at least one quality parameter only from the at least one uplink reference signal. In some examples, the at least one beam failure indication is for a beam failure due to an uplink quality degradation.

In some examples, the base station may derive the at least one quality parameter from both the at least one downlink reference signal and the at least one uplink reference signal. In some examples, the at least one beam failure indication is for a beam failure due to self-interference by the base station.

In one configuration, the BS 1600 includes means for transmitting at least one downlink reference signal, means for receiving at least one uplink reference signal from a user equipment, and means for transmitting a beam failure recovery message to the user equipment based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal. In one configuration, the BS 1600 includes means for measuring at least one downlink reference signal from the base station, means for measuring at least one uplink reference signal from a user equipment, means for deriving at least one quality parameter from the at least one downlink reference signal, the at least one uplink reference signal, or the at least one downlink reference signal and the at least one uplink reference signal, means for comparing the at least one quality parameter to a threshold, and means for generating at least one beam failure indication for a medium access control (MAC) layer based on the comparing of the at least one quality parameter to the threshold. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 4, 5, 7A, 7B, 7C, 9, and 16, and utilizing, for example, the methods and/or algorithms described herein in relation to FIGS. 17 and 18.

The methods shown in FIGS. 14, 15, 17, and 18 may include additional aspects, such as any single aspect or any combination of aspects described below and/or in connection with one or more other processes described elsewhere herein. The following provides an overview of several aspects of the present disclosure.

Aspect 1: A method for full-duplex (FD) communication at a user equipment, the method comprising: receiving at least one downlink reference signal from a base station; transmitting at least one uplink reference signal to the base station; and transmitting a beam failure recovery request to the base station based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal.

Aspect 2: The method of aspect 1, wherein: the at least one downlink reference signal comprises at least one synchronization signal block (SSB) signal or at least one channel state information reference signal (CSI-RS); and the at least one uplink reference signal comprises at least one sounding reference signal (SRS) or at least one demodulation reference signal (DMRS).

Aspect 3: The method of aspect 2, wherein the at least one quality parameter comprises a signal-to-interference-plus-noise ratio (SINR) parameter.

Aspect 4: The method of any of aspects 1 through 3, wherein the at least one quality parameter comprises a block error rate (BLER) based on a signal-to-interference-plus-noise ratio (SINR).

Aspect 5: The method of any of aspects 1 through 4, further comprising: deriving the at least one quality parameter from the at least one downlink reference signal, the at least one uplink reference signal, or the at least one downlink reference signal and the at least one uplink reference signal; and generating at least one beam failure indication for a medium access control (MAC) layer based on the comparison between the at least one quality parameter and the threshold.

Aspect 6: The method of aspect 5, wherein the at least one beam failure indication comprises a MAC layer beam failure instance indication.

Aspect 7: The method of any of aspects 5 through 6, wherein the generating the at least one beam failure indication comprises: sending a respective beam failure indication to the MAC layer each time a derived quality parameter of the at least one quality parameter is less than or equal to the threshold.

Aspect 8: The method of aspect 5, further comprising: generating the beam failure recovery request at the MAC layer based on the at least one beam failure indication.

Aspect 9: The method of aspect 8, wherein the generating the beam failure recovery request comprises: receiving the at least one beam failure indication from a physical layer during a defined detection time; incrementing a counter upon receipt of each beam failure indication of the at least one beam failure indication; and generating the beam failure recovery request when the counter reaches a maximum count threshold during the defined detection time.

Aspect 10: The method of aspect 9, wherein: the maximum count threshold comprises a beam failure instance maximum count for downlink quality measurements and uplink self-interference measurements; and the defined detection time comprises a beam failure detection time for downlink quality measurements and uplink self-interference measurements.

Aspect 11: The method of any of aspects 5 through 10, wherein the deriving the at least one quality parameter comprises: combining SSB signal measurement information and SRS measurement information for the FD communication; combining CSI-RS measurement information and SRS measurement information for the FD communication; combining SSB signal measurement information and DMRS measurement information for the 1-1) communication; or combining CSI-RS measurement information and DMRS measurement information for the FD communication.

Aspect 12: The method of any of aspects 5 through 10, wherein: the deriving the at least one quality parameter comprises deriving the at least one quality parameter only from the at least one downlink reference signal; and the at least one beam failure indication is for a beam failure due to a downlink quality degradation.

Aspect 13: The method of any of aspects 5 through 10, wherein: the deriving the at least one quality parameter comprises deriving the at least one quality parameter from both the at least one downlink reference signal and the at least one uplink reference signal; and the at least one beam failure indication is for a beam failure due to self-interference by the user equipment.

Aspect 14: The method of any of aspects 1 through 13, further comprising: measuring interference from a first beam to a second beam on at least one interference measurement resource (IMR), wherein the first beam is an uplink transmitting beam and the second beam is a downlink receiving beam for the FD communication.

Aspect 15: The method of aspect 14, wherein the measuring interference from the first beam to the second beam comprises: measuring self-interference by the user equipment for the FD communication.

Aspect 16: The method of any of aspects 14 through 15, further comprising: measuring a downlink signal of the second beam on at least one channel measurement resource (CMR).

Aspect 17: The method of aspect 16, further comprising: receiving from the base station a radio link monitoring configuration comprising a first category of radio link monitoring reference signals (RLM-RSs) of the at least one CMR and a second category of RLM-RSs of the at least one IMR.

Aspect 18: The method of aspect 17, wherein: the first category comprises at least one synchronization signal block (SSB) index or at least one channel state information reference signal (CSI-RS) resource identifier; and the second category comprises at least one sounding reference signal (SRS) resource identifier or at least one demodulation reference signal (DMRS) resource identifier.

Aspect 20: A method for full-duplex (1-D) communication at a base station, the method comprising: transmitting at least one downlink reference signal; receiving at least one uplink reference signal from a user equipment; and transmitting a beam failure recovery message to the user equipment based on a comparison between at least one quality parameter and a threshold, wherein the at least one quality parameter is based on respective measurements of the at least one downlink reference signal, the at least one uplink reference signal, or a combination of the at least one downlink reference signal and the at least one uplink reference signal.

Aspect 21: The method of aspect 20, further comprising: transmitting to the user equipment a radio link monitoring configuration comprising a first category of radio link monitoring reference signals (RLM-RSs) of at least one channel measurement resource (CMR) and a second category of RLM-RSs of at least one interference measurement resource (IMR).

Aspect 22: The method of any of aspects 20 through 21, wherein: the at least one quality parameter comprises a first quality parameter for a first downlink (DL) and uplink (UL) beam pair and a second quality parameter for a second DL and UL beam pair for the FD communication; and the method further comprises determining that the first quality parameter for the first DL and UL beam pair is less than or equal to the threshold and that the second quality parameter for the second DL and UL beam pair is less than or equal to the threshold.

Aspect 23: The method of aspect 22, wherein the first quality parameter for the first DL and UL beam pair is equal to the second quality parameter for the second DL and UL beam pair.

Aspect 24: The method of aspect 22, wherein the first quality parameter for the first DL and UL beam pair is different from the second quality parameter for the second DL and UL beam pair.

Aspect 25: The method of any of aspects 20 through 24, wherein the at least one quality parameter comprises a first quality parameter for a first downlink (DL) and uplink (UL) beam pair and a second quality parameter for a second DL and UL beam pair.

Aspect 26: The method of aspect 25, wherein the first quality parameter for the first DL and UL beam pair is equal to the second quality parameter for the second DL and UL beam pair.

Aspect 27: The method of aspect 25, wherein the first quality parameter for the first DL and UL beam pair is different from the second quality parameter for the second DL and UL beam pair.

Aspect 28: The method of any of aspects 25 through 27, further comprising: determining that the first quality parameter for the first DL and UL beam pair is less than or equal to the threshold or determining that the second quality parameter for the second DL and UL beam pair is less than or equal to the threshold.

Aspect 29: The method of any of aspects 25 through 28, further comprising: using a first counter and a first detection timer to monitor the first DL and UL beam pair at a medium access control (MAC) layer; or using a second counter and a second detection timer to monitor the second DL and UL beam pair at the MAC layer.

Aspect 30: A user equipment comprising: a transceiver configured to communicate with a radio access network, a memory, and a processor communicatively coupled to the transceiver and the memory, wherein the processor and the memory are configured to perform any one of aspects 1 through 18.

Aspect 31: An apparatus configured for wireless communication comprising at least one means for performing any one of aspects 1 through 18.

Aspect 32: A non-transitory computer-readable medium storing computer-executable code, comprising code for causing an apparatus to perform any one of aspects 1 through 18.

Aspect 33: A base station comprising: a transceiver, a memory, and a processor communicatively coupled to the transceiver and the memory, wherein the processor and the memory are configured to perform any one of aspects 20 through 29.

Aspect 34: An apparatus configured for wireless communication comprising at least one means for performing any one of aspects 20 through 29.

Aspect 35: A non-transitory computer-readable medium storing computer-executable code, comprising code for causing an apparatus to perform any one of aspects 20 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 7A, 7B, 7C, 9, 13, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver;
a memory storing executable code; and
one or more processors configured to execute the executable code to cause the user equipment to:
receive at least one downlink reference signal from a base station via the transceiver;
transmit at least one uplink reference signal to the base station via the transceiver; and
transmit a beam failure recovery request to the base station via the transceiver based on a comparison between at least one quality parameter and a threshold, wherein the at least one quality parameter is based on respective measurements of the at least one uplink reference signal, or a combination of the at least one downlink reference signal and the at least one uplink reference signal, the beam failure recovery request indicating whether a detected beam failure is due to self-interference during a full-duplex communication.

2. The user equipment of claim 1, wherein:
the at least one downlink reference signal comprises at least one synchronization signal block (SSB) signal or at least one channel state information reference signal (CSI-RS); and
the at least one uplink reference signal comprises at least one sounding reference signal (SRS) or at least one demodulation reference signal (DMRS).

3. The user equipment of claim 1, wherein the at least one quality parameter comprises a signal-to-interference-plus-noise ratio (SINR) parameter.

4. The user equipment of claim 1, wherein the at least one quality parameter comprises a block error rate (BLER) based on a signal-to-interference-plus-noise ratio (SINR).

5. The user equipment of claim 1, wherein the one or more processors is further configured to execute the executable code to cause the user equipment to:
derive the at least one quality parameter from: the at least one downlink reference signal; the at least one uplink reference signal; or both of the at least one downlink reference signal and the at least one uplink reference signal; and
generate at least one beam failure indication fora medium access control (MAC) layer based on the comparison between the at least one quality parameter and the threshold.

6. The user equipment of claim 5, wherein the at least one beam failure indication comprises a beam failure instance indication to be sent to the MAC layer.

7. The user equipment of claim 5, wherein the one or more processors is further configured to execute the executable code to cause the user equipment to:
send a respective beam failure indication to the MAC layer each time a derived quality parameter of the at least one quality parameter is less than or equal to the threshold.

8. The user equipment of claim 5, wherein the one or more processors is further configured to execute the executable code to cause the user equipment to:
generate the beam failure recovery request at the MAC layer based on the at least one beam failure indication.

9. The user equipment of claim 8, wherein the one or more processors is further configured to execute the executable code to cause the user equipment to:
receive the at least one beam failure indication from a physical layer during a defined detection time;
increment a counter upon receipt of each beam failure indication of the at least one beam failure indication; and
generate the beam failure recovery request when the counter reaches a maximum count threshold during the defined detection time.

10. The user equipment of claim 9, wherein:
the maximum count threshold comprises a beam failure instance maximum count for downlink quality measurements and uplink self-interference measurements; and
the defined detection time comprises a beam failure detection time for the downlink quality measurements and the uplink self-interference measurements.

11. The user equipment of claim 5, wherein the one or more processors is further configured to execute the executable code to cause the user equipment to:
combine synchronization signal block (SSB) signal measurement information and sounding reference signal (SRS) measurement information for the full-duplex communication;
combine channel state information reference signal (CSI-RS) measurement information and the SRS measurement information for the full-duplex communication;
combine the SSB signal measurement information and demodulation reference signal (DMRS) measurement information for the full-duplex communication; or
combine the CSI-RS measurement information and the DMRS measurement information for the full-duplex communication.

12. The user equipment of claim 5, wherein:
the one or more processors is further configured to execute the executable code to cause the user equipment to derive the at least one quality parameter from both the at least one downlink reference signal and the at least one uplink reference signal; and
the at least one beam failure indication is for the detected beam failure due to the self-interference.

13. The user equipment of claim 1, wherein the one or more processors is further configured to execute the executable code to cause the user equipment to:
measure interference from a first beam to a second beam on at least one interference measurement resource (IMR), wherein the first beam is an uplink transmitting beam and the second beam is a downlink receiving beam for the full-duplex communication.

14. The user equipment of claim 13, wherein the one or more processors is further configured to execute the executable code to cause the user equipment to:
measure the self-interference during the full-duplex communication.

15. The user equipment of claim 13, wherein the one or more processors is further configured to execute the executable code to cause the user equipment to:
measure a downlink signal of the second beam on at least one channel measurement resource (CMR).

16. The user equipment of claim 15, wherein the one or more processors is further configured to execute the executable code to cause the user equipment to:

receive from the base station a radio link monitoring configuration comprising a first category of radio link monitoring reference signals (RLM-RSs) of the at least one CMR and a second category of RLM-RSs of the at least one IMR.

17. The user equipment of claim 16, wherein:
the first category comprises at least one synchronization signal block (SSB) index or at least one channel state information reference signal (CSI-RS) resource identifier; and
the second category comprises at least one sounding reference signal (SRS) resource identifier or at least one demodulation reference signal (DMRS) resource identifier.

18. A method for communication at a user equipment, the method comprising:
receiving at least one downlink reference signal from a base station;
transmitting at least one uplink reference signal to the base station; and
transmitting a beam failure recovery request to the base station based on a comparison between at least one quality parameter and a threshold, wherein the at least one quality parameter is based on respective measurements of the at least one uplink reference signal, or a combination of the at least one downlink reference signal and the at least one uplink reference signal, the beam failure recovery request indicating whether a detected beam failure is due to self-interference during a full-duplex communication.

19. A base station, comprising:
a transceiver;
a memory storing executable code; and
one or more processors configured to execute the executable code to cause the base station to:
transmit at least one downlink reference signal via the transceiver;
receive at least one uplink reference signal from a user equipment via the transceiver; and
transmit a beam failure recovery message to the user equipment via the transceiver based on a comparison between at least one quality parameter and a threshold, wherein the at least one quality parameter is based on respective measurements of the at least one uplink reference signal, or a combination of the at least one downlink reference signal and the at least one uplink reference signal, the beam failure recovery message indicating whether a detected beam failure is due to self-interference during a full-duplex communication.

20. The base station of claim 19, wherein the one or more processors is further configured to execute the executable code to cause the base station to:
transmit to the user equipment via the transceiver a radio link monitoring configuration comprising a first category of radio link monitoring reference signals (RLM-RSs) of at least one channel measurement resource (CMR) and a second category of RLM-RSs of at least one interference measurement resource (IMR).

21. The base station of claim 19, wherein:
the at least one quality parameter comprises a first quality parameter for a first downlink (DL) and uplink (UL) beam pair and a second quality parameter for a second DL and UL beam pair for the full-duplex communication; and
the one or more processors is further configured to execute the executable code to cause the base station to determine: that the first quality parameter for the first DL and UL beam pair is less than or equal to the threshold; and that the second quality parameter for the second DL and UL beam pair is less than or equal to the threshold.

22. The base station of claim 21, wherein the first quality parameter for the first DL and UL beam pair is equal to the second quality parameter for the second DL and UL beam pair.

23. The base station of claim 21, wherein the first quality parameter for the first DL and UL beam pair is different from the second quality parameter for the second DL and UL beam pair.

24. The base station of claim 19, wherein the at least one quality parameter comprises a first quality parameter for a first downlink (DL) and uplink (UL) beam pair and a second quality parameter for a second DL and UL beam pair.

25. The base station of claim 24, wherein the first quality parameter for the first DL and UL beam pair is equal to the second quality parameter for the second DL and UL beam pair.

26. The base station of claim 24, wherein the first quality parameter for the first DL and UL beam pair is different from the second quality parameter for the second DL and UL beam pair.

27. The base station of claim 24, wherein the one or more processors is further configured to execute the executable code to cause the base station to:
determine that the first quality parameter for the first DL and UL beam pair is less than or equal to the threshold; or
determine that the second quality parameter for the second DL and UL beam pair is less than or equal to the threshold.

28. The base station of claim 24, wherein the one or more processors is further configured to execute the executable code to cause the base station to:
use a first counter and a first detection timer to monitor the first DL and UL beam pair at a medium access control (MAC) layer; or
use a second counter and a second detection timer to monitor the second DL and UL beam pair at the MAC layer.

29. A method for communication at a base station, the method comprising:
transmitting at least one downlink reference signal;
receiving at least one uplink reference signal from a user equipment; and
transmitting a beam failure recovery message to the user equipment based on a comparison between at least one quality parameter and a threshold, wherein the at least one quality parameter is based on respective measurements of the at least one uplink reference signal, or a combination of the at least one downlink reference signal and the at least one uplink reference signal, the beam failure recovery message indicating whether a detected beam failure is due to self-interference during a full-duplex communication.

30. The user equipment of claim 1, wherein the threshold comprises a beam failure instance maximum count for uplink self-interference measurements.

* * * * *